US012656909B2

(12) United States Patent
Paul et al.

(10) Patent No.: US 12,656,909 B2
(45) Date of Patent: Jun. 16, 2026

(54) PIXELATED MUTUAL CAPACITANCE SENSING FOR WATER DETECTION

(71) Applicant: Apple Inc., Cupertino, CA (US)

(72) Inventors: William Paul, San Francisco, CA (US); Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/455,295

(22) Filed: Aug. 24, 2023

(65) Prior Publication Data

US 2024/0103669 A1     Mar. 28, 2024

Related U.S. Application Data

(60) Provisional application No. 63/376,641, filed on Sep. 22, 2022.

(51) Int. Cl.
   G06F 3/041       (2006.01)
   G01N 27/22       (2006.01)
   G06F 3/044       (2006.01)

(52) U.S. Cl.
   CPC ....... G06F 3/04186 (2019.05); G01N 27/223 (2013.01); G01N 27/228 (2013.01);
          (Continued)

(58) Field of Classification Search
   CPC .............. G06F 3/041662; G06F 3/044; G06F 3/04186; G06F 3/0412; G06F 2203/04107; G01N 27/228; G01N 27/223
   See application file for complete search history.

(56) References Cited

U.S. PATENT DOCUMENTS

| | | | |
|---|---|---|---|
| 4,087,625 A | 5/1978 | Dym et al. | |
| 4,090,092 A | 5/1978 | Serrano | |
| (Continued) | | | |

FOREIGN PATENT DOCUMENTS

| | | |
|---|---|---|
| CN | 1202254 A | 12/1998 |
| CN | 1246638 A | 3/2000 |
| (Continued) | | |

OTHER PUBLICATIONS

Thoresen, Christian et al. "Detection of Undergrounded Objects on Mutual Capacitance Touch Screens", 2015 IEEE Sensors Conference. Busan, South Korea. <DOI:10.1109/ICSENS.2015.7370573>, 5 pages.

(Continued)

*Primary Examiner* — Hang Lin
(74) *Attorney, Agent, or Firm* — Kubota & Basol LLP

(57) ABSTRACT

A pixelated mutual capacitance sensing configuration to detect the presence of floating water is disclosed. An integrated touch screen can be configured in a checkerboard arrangement of alternating drive pixels and sense pixels, where each drive or sense pixel can include a plurality of sub-pixels. The sense pixels can include sense sub-pixels surrounded by ground sub-pixels to reduce the baseline mutual capacitance between the drive and sense pixels. Stimulated drive pixels can capacitively couple onto the sense sub-pixels of the sense pixel, forming a baseline (no touch) mutual capacitance between the drive pixels and the sense sub-pixels. The presence of grounded objects shunts some charge to ground and reduces the mutual capacitance, while floating water provides and additional parallel mutual capacitance path that increases the mutual capacitance. Floating water can be distinguished from a grounded touch based on the direction of the change in mutual capacitance.

18 Claims, 9 Drawing Sheets

(52) U.S. Cl.
CPC ........ *G06F 3/041662* (2019.05); *G06F 3/044*
(2013.01); *G06F 2203/04107* (2013.01)

(56) References Cited

U.S. PATENT DOCUMENTS

| | | | |
|---|---|---|---|
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,889,236 A | 3/1999 | Gillespie et al. |
| 5,914,465 A | 6/1999 | Allen et al. |
| 5,923,997 A | 7/1999 | Miyanaga et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,329,044 B1 | 12/2001 | Inoue et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,395,717 B2 | 7/2008 | Deangelis et al. |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,719,523 B2 | 5/2010 | Hillis |
| 7,864,503 B2 | 1/2011 | Chang |
| 7,907,126 B2 | 3/2011 | Yoon et al. |
| 7,932,898 B2 | 4/2011 | Philipp et al. |
| 8,026,904 B2 | 9/2011 | Westerman |
| 8,040,142 B1 | 10/2011 | Bokma et al. |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | Guanghai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |

| | | | |
|---|---|---|---|
| 8,507,811 B2 | 8/2013 | Hotelling et al. |
| 8,508,495 B2 | 8/2013 | Hotelling et al. |
| 8,525,756 B2 | 9/2013 | Kwon |
| 8,537,126 B2 | 9/2013 | Yousefpor et al. |
| 8,542,208 B2 | 9/2013 | Krah et al. |
| 8,576,193 B2 | 11/2013 | Hotelling |
| 8,593,410 B2 | 11/2013 | Hong et al. |
| 8,593,425 B2 | 11/2013 | Hong et al. |
| 8,614,688 B2 | 12/2013 | Chang |
| 8,633,915 B2 | 1/2014 | Hotelling et al. |
| 8,680,877 B2 | 3/2014 | Lee et al. |
| 8,760,412 B2 | 6/2014 | Hotelling et al. |
| 8,773,146 B1 | 7/2014 | Hills et al. |
| 8,810,543 B1 | 8/2014 | Kurikawa |
| 8,884,917 B2 | 11/2014 | Seo |
| 8,902,172 B2 | 12/2014 | Peng et al. |
| 8,917,253 B2 | 12/2014 | Singh et al. |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 | 3/2015 | Kuzo et al. |
| 9,001,082 B1 | 4/2015 | Rosenberg et al. |
| 9,024,913 B1 | 5/2015 | Jung et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,189,119 B2 | 11/2015 | Liao et al. |
| 9,261,997 B2 | 2/2016 | Chang et al. |
| 9,280,251 B2 | 3/2016 | Shih |
| 9,292,137 B2 | 3/2016 | Kogo |
| 9,317,165 B2 | 4/2016 | Hotelling et al. |
| 9,329,674 B2 | 5/2016 | Lee et al. |
| 9,329,723 B2 | 5/2016 | Benbasat et al. |
| 9,372,576 B2 | 6/2016 | Westerman |
| 9,582,131 B2 | 2/2017 | Elias |
| 9,690,397 B2 | 6/2017 | Shepelev et al. |
| 9,710,099 B2 | 7/2017 | Rhee et al. |
| 9,785,295 B2 | 10/2017 | Yang et al. |
| 9,804,717 B2 | 10/2017 | Schropp, Jr. |
| 9,874,975 B2 | 1/2018 | Benbasat et al. |
| 9,880,655 B2 | 1/2018 | O'connor |
| 9,886,141 B2 | 2/2018 | Yousefpor |
| 9,904,427 B1 | 2/2018 | Co et al. |
| 9,996,175 B2 | 6/2018 | Hotelling et al. |
| 10,001,888 B2 | 6/2018 | Hong et al. |
| 10,061,433 B2 | 8/2018 | Imai et al. |
| 10,073,562 B2 | 9/2018 | Mo et al. |
| 10,254,896 B2 | 4/2019 | Mori et al. |
| 10,289,251 B2 | 5/2019 | Shih et al. |
| 10,365,764 B2 | 7/2019 | Korapati et al. |
| 10,705,658 B2 | 7/2020 | Li et al. |
| 10,725,591 B1 | 7/2020 | Maharyta et al. |
| 10,795,488 B2 | 10/2020 | Krah |
| 11,157,109 B1 | 10/2021 | Shorten et al. |
| 11,422,689 B1 * | 8/2022 | Spencer ............... G06F 3/0447 |
| 2002/0152048 A1 | 10/2002 | Hayes |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0119701 A1 | 6/2004 | Mulligan et al. |
| 2004/0188151 A1 | 9/2004 | Gerpheide et al. |
| 2004/0189617 A1 | 9/2004 | Gerpheide et al. |
| 2004/0239650 A1 | 12/2004 | Mackey |
| 2004/0241920 A1 | 12/2004 | Hsiao et al. |
| 2005/0007353 A1 | 1/2005 | Smith et al. |
| 2005/0012724 A1 | 1/2005 | Kent |
| 2005/0069718 A1 | 3/2005 | Voss-kehl et al. |
| 2005/0073507 A1 | 4/2005 | Richter et al. |
| 2005/0083307 A1 | 4/2005 | Aufderheide et al. |
| 2005/0104867 A1 | 5/2005 | Westerman et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |

(56)  References Cited

U.S. PATENT DOCUMENTS

| | | |
|---|---|---|
| 2005/0280639 A1 | 12/2005 | Taylor et al. |
| 2006/0001640 A1 | 1/2006 | Lee |
| 2006/0017710 A1 | 1/2006 | Lee et al. |
| 2006/0026521 A1 | 2/2006 | Hotelling et al. |
| 2006/0038791 A1 | 2/2006 | Mackey |
| 2006/0097991 A1 | 5/2006 | Hotelling et al. |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0227115 A1 | 10/2006 | Fry |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279619 A1 | 12/2007 | Chang |
| 2007/0283832 A1 | 12/2007 | Hotelling |
| 2007/0285365 A1 | 12/2007 | Lee |
| 2007/0296709 A1 | 12/2007 | Guanghai |
| 2008/0006454 A1 | 1/2008 | Hotelling |
| 2008/0007533 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0062151 A1 | 3/2008 | Kent |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0054107 A1 | 2/2009 | Feland et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey et al. |
| 2009/0213090 A1 | 8/2009 | Mamba et al. |
| 2009/0229892 A1 | 9/2009 | Fisher et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0273579 A1 | 11/2009 | Zachut et al. |
| 2009/0277695 A1 | 11/2009 | Liu et al. |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2009/0322410 A1 | 12/2009 | David et al. |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0149108 A1 | 6/2010 | Hotelling et al. |
| 2010/0156810 A1 | 6/2010 | Barbier et al. |
| 2010/0156846 A1 | 6/2010 | Long et al. |
| 2010/0182278 A1 | 7/2010 | Li et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0245286 A1 | 9/2010 | Parker |
| 2010/0253638 A1 | 10/2010 | Yousefpor et al. |
| 2010/0259503 A1 | 10/2010 | Yanase et al. |
| 2010/0328228 A1 | 12/2010 | Elias |
| 2010/0328248 A1 | 12/2010 | Mozdzyn |
| 2010/0328263 A1 | 12/2010 | Lin |
| 2011/0006832 A1 | 1/2011 | Land et al. |
| 2011/0007020 A1 | 1/2011 | Hong et al. |
| 2011/0025623 A1 | 2/2011 | Lin |
| 2011/0025629 A1 | 2/2011 | Grivna et al. |
| 2011/0025635 A1 | 2/2011 | Lee |
| 2011/0061949 A1 | 3/2011 | Krah et al. |
| 2011/0074705 A1 | 3/2011 | Yousefpor et al. |
| 2011/0096016 A1 | 4/2011 | Yilmaz |
| 2011/0134050 A1 | 6/2011 | Harley |
| 2011/0157068 A1 | 6/2011 | Parker et al. |
| 2011/0175846 A1 | 7/2011 | Wang et al. |
| 2011/0193776 A1 | 8/2011 | Oda et al. |
| 2011/0199105 A1 | 8/2011 | Otagaki et al. |
| 2011/0227874 A1 | 9/2011 | Fahraeus et al. |
| 2011/0231139 A1 | 9/2011 | Yokota et al. |
| 2011/0234523 A1 | 9/2011 | Chang et al. |
| 2011/0234526 A1 | 9/2011 | Mi |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |

(56)  References Cited

U.S. PATENT DOCUMENTS

| | | |
|---|---|---|
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin et al. |
| 2012/0050216 A1 | 3/2012 | Kremin et al. |
| 2012/0050217 A1 | 3/2012 | Noguchi et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0146726 A1 | 6/2012 | Huang et al. |
| 2012/0146920 A1 | 6/2012 | Lin et al. |
| 2012/0146942 A1 | 6/2012 | Kamoshida et al. |
| 2012/0154324 A1 | 6/2012 | Wright et al. |
| 2012/0162121 A1 | 6/2012 | Chang et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2012/0313881 A1 | 12/2012 | Ge et al. |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang et al. |
| 2013/0057511 A1 | 3/2013 | Shepelev et al. |
| 2013/0069911 A1 | 3/2013 | You |
| 2013/0076648 A1 | 3/2013 | Krah et al. |
| 2013/0093712 A1 | 4/2013 | Liu et al. |
| 2013/0100038 A1 | 4/2013 | Yilmaz et al. |
| 2013/0100071 A1 | 4/2013 | Wright et al. |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0215075 A1 | 8/2013 | Lee et al. |
| 2013/0224370 A1 | 8/2013 | Cok et al. |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0257798 A1 | 10/2013 | Tamura et al. |
| 2013/0265276 A1 | 10/2013 | Obeidat et al. |
| 2013/0271427 A1 | 10/2013 | Benbasat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0278543 A1 | 10/2013 | Hsu et al. |
| 2013/0307821 A1 | 11/2013 | Kogo |
| 2013/0308031 A1 | 11/2013 | Theuwissen |
| 2013/0314342 A1 | 11/2013 | Kim et al. |
| 2013/0320994 A1 | 12/2013 | Brittain et al. |
| 2013/0321289 A1 | 12/2013 | Dubery et al. |
| 2013/0328759 A1 | 12/2013 | Al-dahle et al. |
| 2013/0342479 A1 | 12/2013 | Pyo et al. |
| 2014/0002406 A1 | 1/2014 | Cormier, Jr. et al. |
| 2014/0009438 A1 | 1/2014 | Liu et al. |
| 2014/0022186 A1 | 1/2014 | Hong et al. |
| 2014/0022201 A1 | 1/2014 | Boychuk et al. |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0098033 A1 | 4/2014 | Simmons |
| 2014/0098051 A1 | 4/2014 | Hong et al. |
| 2014/0099894 A1 | 4/2014 | Singh et al. |
| 2014/0104194 A1 | 4/2014 | Davidson et al. |
| 2014/0104225 A1 | 4/2014 | Davidson et al. |
| 2014/0104228 A1 | 4/2014 | Chen et al. |
| 2014/0111707 A1 | 4/2014 | Song et al. |
| 2014/0118270 A1 | 5/2014 | Moses et al. |
| 2014/0125628 A1 | 5/2014 | Yoshida et al. |
| 2014/0145997 A1 | 5/2014 | Tiruvuru |
| 2014/0146009 A1 | 5/2014 | Huang |
| 2014/0152615 A1 | 6/2014 | Chang et al. |
| 2014/0160058 A1 | 6/2014 | Chen et al. |
| 2014/0160065 A1 | 6/2014 | Zhang et al. |
| 2014/0168540 A1 | 6/2014 | Wang et al. |
| 2014/0204043 A1 | 7/2014 | Lin et al. |
| 2014/0204058 A1 | 7/2014 | Huang et al. |
| 2014/0210779 A1 | 7/2014 | Katsuta et al. |
| 2014/0232681 A1 | 8/2014 | Yeh |
| 2014/0232955 A1 | 8/2014 | Roudbari et al. |
| 2014/0240284 A1* | 8/2014 | Paulsen ................. G06F 3/0445 345/174 |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0306924 A1 | 10/2014 | Lin et al. |
| 2014/0347574 A1 | 11/2014 | Tung et al. |
| 2014/0354301 A1 | 12/2014 | Trend |
| 2014/0354555 A1 | 12/2014 | Shahparnia et al. |
| 2014/0362030 A1 | 12/2014 | Mo et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0009421 A1 | 1/2015 | Choi et al. |
| 2015/0015528 A1 | 1/2015 | Vandermeijden |
| 2015/0022481 A1* | 1/2015 | Andersson .......... G06F 3/04186 345/174 |
| 2015/0026398 A1 | 1/2015 | Kim |
| 2015/0035779 A1* | 2/2015 | Guarneri ............... G06F 3/0488 345/173 |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1 | 2/2015 | Yousefpor et al. |
| 2015/0062063 A1 | 3/2015 | Cheng et al. |
| 2015/0077375 A1 | 3/2015 | Hotelling et al. |
| 2015/0077394 A1 | 3/2015 | Dai et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0167177 A1 | 6/2015 | Choi |
| 2015/0227240 A1 | 8/2015 | Hong et al. |
| 2015/0242028 A1 | 8/2015 | Roberts et al. |
| 2015/0242043 A1 | 8/2015 | Oda |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0324035 A1 | 11/2015 | Yuan et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0018348 A1 | 1/2016 | Yau et al. |

(56) References Cited

U.S. PATENT DOCUMENTS

| | | | |
|---|---|---|---|
| 2016/0022218 A1 | 1/2016 | Hayes et al. | |
| 2016/0041629 A1 | 2/2016 | Rao et al. | |
| 2016/0048234 A1 | 2/2016 | Chandran et al. | |
| 2016/0062533 A1 | 3/2016 | O'connor | |
| 2016/0077667 A1 | 3/2016 | Chiang et al. | |
| 2016/0117032 A1 | 4/2016 | Lin et al. | |
| 2016/0139728 A1 | 5/2016 | Jeon et al. | |
| 2016/0154505 A1 | 6/2016 | Chang et al. | |
| 2016/0154529 A1 | 6/2016 | Westerman | |
| 2016/0195954 A1 | 7/2016 | Wang et al. | |
| 2016/0224177 A1 | 8/2016 | Krah | |
| 2016/0224189 A1 | 8/2016 | Yousefpor et al. | |
| 2016/0246423 A1 | 8/2016 | Fu | |
| 2016/0253041 A1 | 9/2016 | Park et al. | |
| 2016/0259448 A1 | 9/2016 | Guarneri | |
| 2016/0266676 A1 | 9/2016 | Wang et al. | |
| 2016/0266679 A1 | 9/2016 | Shahparnia et al. | |
| 2016/0282980 A1 | 9/2016 | Chintalapoodi et al. | |
| 2016/0283023 A1 | 9/2016 | Shin et al. | |
| 2016/0299603 A1 | 10/2016 | Tsujioka et al. | |
| 2016/0357344 A1 | 12/2016 | Benbasat et al. | |
| 2017/0090599 A1 | 3/2017 | Kuboyama et al. | |
| 2017/0090619 A1 | 3/2017 | Yousefpor et al. | |
| 2017/0097703 A1 | 4/2017 | Lee | |
| 2017/0139539 A1 | 5/2017 | Yao et al. | |
| 2017/0168626 A1 | 6/2017 | Konicek | |
| 2017/0229502 A1 | 8/2017 | Liu et al. | |
| 2017/0269729 A1 | 9/2017 | Chintalapoodi | |
| 2017/0285804 A1 | 10/2017 | Li et al. | |
| 2017/0357371 A1 | 12/2017 | Kim et al. | |
| 2018/0067584 A1 | 3/2018 | Zhu et al. | |
| 2018/0088706 A1 | 3/2018 | Tanemura et al. | |
| 2018/0224962 A1 | 8/2018 | Mori | |
| 2018/0275824 A1 | 9/2018 | Li et al. | |
| 2018/0307374 A1 | 10/2018 | Shah et al. | |
| 2018/0307375 A1 | 10/2018 | Shah et al. | |
| 2018/0367139 A1 | 12/2018 | Pribisic et al. | |
| 2019/0034032 A1 | 1/2019 | Westerman | |
| 2019/0138152 A1 | 5/2019 | Yousefpor et al. | |
| 2019/0220115 A1 | 7/2019 | Mori et al. | |
| 2019/0237963 A1 | 8/2019 | Wuerstlein et al. | |
| 2020/0026377 A1* | 1/2020 | Gwon | G06F 3/04182 |
| 2020/0333902 A1 | 10/2020 | Li et al. | |
| 2020/0341585 A1 | 10/2020 | Li et al. | |
| 2020/0387259 A1 | 12/2020 | Krah | |
| 2022/0011920 A1 | 1/2022 | Shorten et al. | |
| 2022/0058355 A1 | 2/2022 | Yoshida | |
| 2022/0100297 A1 | 3/2022 | Tille et al. | |
| 2022/0300118 A1* | 9/2022 | Bo | G06F 3/0412 |
| 2022/0404925 A1* | 12/2022 | Gray | G06F 3/04166 |
| 2023/0040857 A1 | 2/2023 | Krah | |

FOREIGN PATENT DOCUMENTS

| | | | |
|---|---|---|---|
| CN | 1527274 A | 9/2004 | |
| CN | 1672119 A | 9/2005 | |
| CN | 1689677 A | 11/2005 | |
| CN | 1711520 A | 12/2005 | |
| CN | 1782837 A | 6/2006 | |
| CN | 1818842 A | 8/2006 | |
| CN | 1864124 A | 11/2006 | |
| CN | 1945516 A | 4/2007 | |
| CN | 101046720 A | 10/2007 | |
| CN | 101071354 A | 11/2007 | |
| CN | 101122838 A | 2/2008 | |
| CN | 101349957 A | 1/2009 | |
| CN | 101419516 A | 4/2009 | |
| CN | 101840293 A | 9/2010 | |
| CN | 101847068 A | 9/2010 | |
| CN | 102023768 A | 4/2011 | |
| CN | 102208165 A | 10/2011 | |
| CN | 102411460 A | 4/2012 | |
| CN | 102483659 A | 5/2012 | |
| CN | 102681715 A | 9/2012 | |
| CN | 102782626 A | 11/2012 | |
| CN | 102968235 A | 3/2013 | |
| CN | 103049148 A | 4/2013 | |
| CN | 103052930 A | 4/2013 | |
| CN | 103221910 A | 7/2013 | |
| CN | 103258492 A | 8/2013 | |
| CN | 103294321 A | 9/2013 | |
| CN | 103365500 A | 10/2013 | |
| CN | 103365506 A | 10/2013 | |
| CN | 103577008 A | 2/2014 | |
| CN | 103677469 A | 3/2014 | |
| CN | 103809810 A | 5/2014 | |
| CN | 103885627 A | 6/2014 | |
| CN | 104020908 A | 9/2014 | |
| CN | 104142757 A | 11/2014 | |
| CN | 104252266 A | 12/2014 | |
| CN | 105045446 A | 11/2015 | |
| CN | 102648446 B | 1/2016 | |
| CN | 105278739 A | 1/2016 | |
| CN | 105474154 A | 4/2016 | |
| CN | 105824461 A | 8/2016 | |
| DE | 112008001245 T5 | 3/2010 | |
| DE | 102011089693 A1 | 6/2013 | |
| EP | 0853230 A1 | 7/1998 | |
| EP | 1192585 A1 | 4/2002 | |
| EP | 1455264 A2 | 9/2004 | |
| EP | 1573706 A2 | 9/2005 | |
| EP | 1573706 A3 | 9/2005 | |
| EP | 1644918 A2 | 4/2006 | |
| EP | 1717677 A2 | 11/2006 | |
| EP | 1745356 A2 | 1/2007 | |
| EP | 1455264 A3 | 3/2007 | |
| EP | 1717677 A3 | 1/2008 | |
| EP | 1918803 A1 | 5/2008 | |
| EP | 1986084 A1 | 10/2008 | |
| EP | 2077489 A1 | 7/2009 | |
| EP | 2256606 A2 | 12/2010 | |
| EP | 1455264 B1 | 5/2011 | |
| EP | 2495643 A2 | 9/2012 | |
| FR | 2896595 A1 | 7/2007 | |
| FR | 2949008 A1 | 2/2011 | |
| GB | 1546317 A | 5/1979 | |
| GB | 2144146 A | 2/1985 | |
| GB | 2428306 A | 1/2007 | |
| GB | 2437827 A | 11/2007 | |
| GB | 2450207 A | 12/2008 | |
| JP | H06-168066 A | 6/1994 | |
| JP | H10-505183 A | 5/1998 | |
| JP | 2000-163031 A | 6/2000 | |
| JP | 3134925 B2 | 2/2001 | |
| JP | 2002-342033 A | 11/2002 | |
| JP | 2003-66417 A | 3/2003 | |
| JP | 2004-503835 A | 2/2004 | |
| JP | 2005-30901 A | 2/2005 | |
| JP | 2005-84128 A | 3/2005 | |
| JP | 2005-301373 A | 10/2005 | |
| JP | 2007-18515 A | 1/2007 | |
| JP | 2008-510251 A | 4/2008 | |
| JP | 2008-225415 A | 9/2008 | |
| JP | 2010-528186 A | 8/2010 | |
| KR | 10-2004-0091728 A | 10/2004 | |
| KR | 10-2007-0002327 A | 1/2007 | |
| KR | 10-2008-0019125 A | 3/2008 | |
| KR | 10-2012-0085737 A | 8/2012 | |
| KR | 10-2012-0100488 A | 9/2012 | |
| KR | 101281018 B1 | 7/2013 | |
| KR | 10-2013-0094495 A | 8/2013 | |
| KR | 10-2013-0117499 A | 10/2013 | |
| KR | 10-2014-0074454 A | 6/2014 | |
| KR | 101609992 B1 | 4/2016 | |
| TW | 200715015 A | 4/2007 | |
| TW | 200835294 A | 8/2008 | |
| TW | M341273 U | 9/2008 | |
| TW | M344522 U | 11/2008 | |
| TW | M344544 U | 11/2008 | |
| TW | M352721 U | 3/2009 | |
| TW | 201115442 A | 5/2011 | |
| TW | 201203069 A | 1/2012 | |
| TW | 201401129 A | 1/2014 | |
| TW | 201419071 A | 5/2014 | |

(56) References Cited

FOREIGN PATENT DOCUMENTS

| | | | |
|---|---|---|---|
| TW | 201419104 | A | 5/2014 |
| WO | 1999/35633 | A2 | 7/1999 |
| WO | 1999/35633 | A3 | 9/1999 |
| WO | 2000/73984 | A1 | 12/2000 |
| WO | 2001/97204 | A1 | 12/2001 |
| WO | 2002/080637 | A1 | 10/2002 |
| WO | 2003/079176 | A2 | 9/2003 |
| WO | 2004/013833 | A2 | 2/2004 |
| WO | 2004/112448 | A2 | 12/2004 |
| WO | 2004/114265 | A2 | 12/2004 |
| WO | 2004/013833 | A3 | 8/2005 |
| WO | 2006/020305 | A2 | 2/2006 |
| WO | 2006/023147 | A2 | 3/2006 |
| WO | 2006/023147 | A3 | 5/2006 |
| WO | 2006/104745 | A2 | 10/2006 |
| WO | 2006/130584 | A2 | 12/2006 |
| WO | 2007/012899 | A1 | 2/2007 |
| WO | 2007/034591 | A1 | 3/2007 |
| WO | 2006/020305 | A3 | 5/2007 |
| WO | 2006/104745 | A3 | 5/2007 |
| WO | 2006/130584 | A3 | 5/2007 |
| WO | 2007/054018 | A1 | 5/2007 |
| WO | 2007/066488 | A1 | 6/2007 |
| WO | 2007/089766 | A2 | 8/2007 |
| WO | 2007/115032 | A2 | 10/2007 |
| WO | 2007/146785 | A2 | 12/2007 |
| WO | 2007/115032 | A3 | 1/2008 |
| WO | 2008/007118 | A2 | 1/2008 |
| WO | 2008/047990 | A1 | 4/2008 |
| WO | 2007/146785 | A3 | 5/2008 |
| WO | 2008/076237 | A2 | 6/2008 |
| WO | 2008/007118 | A3 | 8/2008 |
| WO | 2008/076237 | A3 | 8/2008 |
| WO | 2007/089766 | A3 | 9/2008 |
| WO | 2008/108514 | A1 | 9/2008 |
| WO | 2008/135713 | A1 | 11/2008 |
| WO | 2009/046363 | A1 | 4/2009 |
| WO | 2009/103946 | A1 | 8/2009 |
| WO | 2009/132146 | A1 | 10/2009 |
| WO | 2009/132150 | A1 | 10/2009 |
| WO | 2010/088659 | A1 | 8/2010 |
| WO | 2010/117882 | A2 | 10/2010 |
| WO | 2011/071784 | A1 | 6/2011 |
| WO | 2011/137200 | A1 | 11/2011 |
| WO | 2013/158570 | A1 | 10/2013 |
| WO | 2014/105942 | A1 | 7/2014 |
| WO | 2014/127716 | A1 | 8/2014 |
| WO | 2015/017196 | A1 | 2/2015 |
| WO | 2015/023410 | A1 | 2/2015 |
| WO | 2015/072722 | A1 | 5/2015 |
| WO | 2015/107969 | A1 | 7/2015 |
| WO | 2015/178920 | A1 | 11/2015 |
| WO | 2016/048269 | A1 | 3/2016 |
| WO | 2016/069642 | A1 | 5/2016 |
| WO | 2016/126525 | A1 | 8/2016 |
| WO | 2016/144437 | A1 | 9/2016 |
| WO | 2017/058413 | A1 | 4/2017 |
| WO | 2017/058415 | A2 | 4/2017 |
| WO | 2018047020 | A1 | 3/2018 |

OTHER PUBLICATIONS

Advisory Action received for U.S. Appl. No. 11/818,498, mailed on May 17, 2013, 5 pages.

Advisory Action received for U.S. Appl. No. 11/818,498, mailed on Oct. 14, 2011, 5 pages.

Advisory Action received for U.S. Appl. No. 12/206,680, mailed on Apr. 16, 2012, 3 pages.

Advisory Action received for U.S. Appl. No. 12/238,333, mailed on Dec. 17, 2013, 3 pages.

Advisory Action received for U.S. Appl. No. 12/238,333, mailed on Oct. 21, 2015, 4 pages.

Advisory Action received for U.S. Appl. No. 12/500,911, mailed on May 17, 2013, 3 pages.

Advisory Action received for U.S. Appl. No. 12/642,466, mailed on May 23, 2013, 2 pages.

Advisory Action received for U.S. Appl. No. 14/082,003, mailed on Mar. 10, 2016, 3 pages.

Advisory Action received for U.S. Appl. No. 14/645,120, mailed on Nov. 25, 2016, 3 pages.

Advisory Action received for U.S. Appl. No. 15/017,463, mailed on Aug. 8, 2018, 3 pages.

Examiner's Answer to Appeal Brief received for U.S. Appl. No. 11/818,498, mailed on Dec. 20, 2013, 17 pages.

Examiner's Answer to Appeal Brief received for U.S. Appl. No. 17/448,879, mailed on Sep. 18, 2023, 23 pages.

Extended European Search report received for European Patent Application No. 08022505.5, mailed on Apr. 25, 2012, 12 pages.

Extended European Search Report received for European Patent Application No. 10151969.2, mailed on Jul. 21, 2010, 5 pages.

Extended European Search Report received for European Patent Application No. 12162177.5, mailed on Dec. 3, 2012, 7 pages.

Extended European Search Report received for European Patent Application No. 12192450.0, mailed on Feb. 13, 2013, 6 pages.

Extended European Search Report received for European Patent Application No. 15166813.4, mailed on Aug. 31, 2015, 8 pages.

Extended European Search Report received for European Patent Application No. 18197785.1, mailed on Apr. 5, 2019, 8 pages.

Final Office Action received for U.S. Appl. No. 16/924,047, mailed on Apr. 13, 2022, 15 pages.

Final Office Action received for U.S. Appl. No. 11/818,498, mailed on Jan. 3, 2013, 17 pages.

Final Office Action received for U.S. Appl. No. 11/818,498, mailed on Jun. 10, 2011, 16 pages.

Final Office Action received for U.S. Appl. No. 12/038,760, mailed on Jul. 23, 2013, 20 pages.

Final Office Action received for U.S. Appl. No. 12/038,760, mailed on Jun. 8, 2011, 21 pages.

Final Office Action received for U.S. Appl. No. 12/110,024, mailed on Dec. 24, 2012, 21 pages.

Final Office Action received for U.S. Appl. No. 12/110,024, mailed on Jan. 19, 2012, 12 pages.

Final Office Action received for U.S. Appl. No. 12/110,075, mailed on Aug. 31, 2012, 15 pages.

Final Office Action received for U.S. Appl. No. 12/206,680, mailed on Jan. 5, 2012, 16 pages.

Final Office Action received for U.S. Appl. No. 12/206,680, mailed on Jan. 27, 2014, 20 pages.

Final Office Action received for U.S. Appl. No. 12/206,680, mailed on May 22, 2013, 16 pages.

Final Office Action received for U.S. Appl. No. 12/238,333, mailed on Apr. 22, 2015, 23 pages.

Final Office Action received for U.S. Appl. No. 12/238,333, mailed on Aug. 12, 2013, 19 pages.

Final Office Action received for U.S. Appl. No. 12/238,342, mailed on Aug. 13, 2013, 14 pages.

Final Office Action received for U.S. Appl. No. 12/238,342, mailed on Oct. 22, 2014, 16 pages.

Final Office Action received for U.S. Appl. No. 12/333,250, mailed on Dec. 15, 2011, 13 pages.

Final Office Action received for U.S. Appl. No. 12/494,173, mailed on Apr. 30, 2013, 7 pages.

Final Office Action received for U.S. Appl. No. 12/500,911, mailed on Feb. 5, 2013, 16 pages.

Final Office Action received for U.S. Appl. No. 12/545,604, mailed on Jul. 16, 2014, 18 pages.

Final Office Action received for U.S. Appl. No. 12/545,604, mailed on Jul. 19, 2013, 18 pages.

Final Office Action received for U.S. Appl. No. 12/545,754, mailed on Jun. 21, 2013, 6 pages.

Final Office Action received for U.S. Appl. No. 12/642,466, mailed on Feb. 1, 2013, 10 pages.

Final Office Action received for U.S. Appl. No. 12/642,466, mailed on Jan. 29, 2016, 10 pages.

Final Office Action received for U.S. Appl. No. 12/642,466, mailed on May 9, 2014, 13 pages.

(56) References Cited

OTHER PUBLICATIONS

Final Office Action received for U.S. Appl. No. 12/847,987, mailed on Apr. 23, 2014, 16 pages.

Final Office Action received for U.S. Appl. No. 13/448,182, mailed on Jun. 11, 2015, 13 pages.

Final Office Action received for U.S. Appl. No. 13/899,391, mailed on Apr. 8, 2016, 10 pages.

Final Office Action received for U.S. Appl. No. 14/082,003, mailed on Jan. 4, 2016, 26 pages.

Final Office Action received for U.S. Appl. No. 14/082,003, mailed on Nov. 4, 2016, 19 pages.

Final Office Action received for U.S. Appl. No. 14/082,074, mailed on Nov. 12, 2015, 23 pages.

Final Office Action received for U.S. Appl. No. 14/318,157, mailed on Jul. 26, 2017, 10 pages.

Final Office Action received for U.S. Appl. No. 14/318,157, mailed on May 9, 2016, 10 pages.

Final Office Action received for U.S. Appl. No. 14/550,686, mailed on Aug. 21, 2017, 12 pages.

Final Office Action received for U.S. Appl. No. 14/550,686, mailed on Jun. 14, 2016, 11 pages.

Final Office Action received for U.S. Appl. No. 14/558,529, mailed on Sep. 29, 2016, 23 pages.

Final Office Action received for U.S. Appl. No. 14/645,120, mailed on Aug. 10, 2017, 13 pages.

Final Office Action received for U.S. Appl. No. 14/645,120, mailed on May 27, 2016, 13 pages.

Final Office Action received for U.S. Appl. No. 14/993,017, mailed on Aug. 16, 2018, 35 pages.

Final Office Action received for U.S. Appl. No. 14/997,031, mailed on Jun. 14, 2018, 19 pages.

Final Office Action received for U.S. Appl. No. 15/006,987, mailed on Dec. 5, 2017, 16 pages.

Final Office Action received for U.S. Appl. No. 15/006,987, mailed on May 14, 2018, 11 pages.

Final Office Action received for U.S. Appl. No. 15/009,774, mailed on Feb. 6, 2019, 16 pages.

Final Office Action received for U.S. Appl. No. 15/017,463, mailed on Feb. 13, 2020, 22 pages.

Final Office Action received for U.S. Appl. No. 15/017,463, mailed on May 17, 2018, 23 pages.

Final Office Action received for U.S. Appl. No. 15/097,179, mailed on Jul. 27, 2018, 12 pages.

Final Office Action received for U.S. Appl. No. 15/313,549, mailed on Dec. 18, 2019, 24 pages.

Final Office Action received for U.S. Appl. No. 15/507,722, mailed on Sep. 13, 2019, 18 pages.

Final Office Action received for U.S. Appl. No. 15/522,737, mailed on Sep. 12, 2019, 15 pages.

Final Office Action received for U.S. Appl. No. 16/152,326, mailed on Dec. 4, 2020, 10 pages.

Final Office Action received for U.S. Appl. No. 16/152,326, mailed on Jan. 27, 2020, 10 pages.

Final Office Action received for U.S. Appl. No. 16/201,730, mailed on Nov. 1, 2019, 11 pages.

Final Office Action received for U.S. Appl. No. 16/921,817, mailed on Jun. 22, 2022, 24 pages.

Final Office Action received for U.S. Appl. No. 17/448,879, mailed on Jan. 9, 2023, 19 pages.

First Action Interview Office Action received for U.S. Appl. No. 15/686,969, mailed on Aug. 19, 2019, 7 pages.

International Search Report received for PCT Patent Application No. PCT/US2008/078836, mailed on Mar. 19, 2009, 3 pages.

International Search Report received for PCT Patent Application No. PCT/US2009/041460, mailed on Jul. 17, 2009, 3 pages.

International Search Report received for PCT Patent Application No. PCT/US2009/041465, mailed on Aug. 5, 2009, 4 pages.

International Search Report received for PCT Patent Application No. PCT/US2010/022868, mailed on Mar. 10, 2010, 3 pages.

International Search Report received for PCT Patent Application No. PCT/US2010/029698, mailed on Jan. 14, 2011, 4 pages.

International Search Report received for PCT Patent Application No. PCT/US2010/058988, mailed on May 2, 2011, 4 pages.

International Search Report received for PCT Patent Application No. PCT/US2013/036662, mailed on Aug. 6, 2013, 3 pages.

International Search Report received for PCT Patent Application No. PCT/US2014/039245, mailed on Sep. 24, 2014, 3 pages.

International Search Report received for PCT Patent Application No. PCT/US2014/047888, mailed on Jan. 29, 2015, 6 pages.

International Search Report received for PCT Patent Application No. PCT/US2014/056795, mailed on Dec. 12, 2014, 3 pages.

Yang et al., "A Noise-Immune High-Speed Readout Circuit for In-Cell Touch Screen Panels", IEEE Transactions on Circuits and Systems-I: Regular Papers vol. 60, No. 7, Jul. 2013, pp. 1800-1809.

International Search Report received for PCT Patent Application No. PCT/US2016/015479, mailed on May 9, 2016, 3 pages.

International Search Report received for PCT Patent Application No. PCT/US2016/016011, mailed on May 11, 2016, 4 pages.

International Search Report received for PCT Patent Application No. PCT/US2016/048694, mailed on Oct. 31, 2016, 4 pages.

International Search Report received for PCT Patent Application No. PCT/US2016/048750, mailed on May 4, 2017, 6 pages.

Non-Final Office Action received for U.S. Appl. No. 11/818,498, mailed on Dec. 13, 2010, 16 pages.

Non-Final Office Action received for U.S. Appl. No. 11/818,498, mailed on May 25, 2012, 17 pages.

Non-Final Office Action received for U.S. Appl. No. 12/038,760, mailed on Feb. 4, 2011, 19 pages.

Non-Final Office Action received for U.S. Appl. No. 12/038,760, mailed on Jan. 2, 2013, 20 pages.

Non-Final Office Action received for U.S. Appl. No. 12/110,024, mailed on Jul. 3, 2012, 20 pages.

Non-Final Office Action received for U.S. Appl. No. 12/110,024, mailed on Jul. 11, 2011, 13 pages.

Non-Final Office Action received for U.S. Appl. No. 12/110,075, mailed on Jan. 25, 2012, 22 pages.

Non-Final Office Action received for U.S. Appl. No. 12/110,075, mailed on Jul. 8, 2011, 15 pages.

Non-Final Office Action received for U.S. Appl. No. 12/110,075, mailed on Mar. 28, 2013, 14 pages.

Non-Final Office Action received for U.S. Appl. No. 12/206,680, mailed on Jun. 9, 2011, 14 pages.

Non-Final Office Action received for U.S. Appl. No. 12/206,680, mailed on Sep. 26, 2012, 14 pages.

Non-Final Office Action received for U.S. Appl. No. 12/206,680, mailed on Sep. 30, 2013, 19 pages.

Non-Final Office Action received for U.S. Appl. No. 12/238,333, mailed on Jan. 7, 2013, 21 pages.

Non-Final Office Action received for U.S. Appl. No. 12/238,333, mailed on May 3, 2012, 24 pages.

Non-Final Office Action received for U.S. Appl. No. 12/238,333, mailed on Sep. 18, 2024, 22 pages.

Non-Final Office Action received for U.S. Appl. No. 12/238,342, mailed on Feb. 15, 2013, 18 pages.

Non-Final Office Action received for U.S. Appl. No. 12/238,342, mailed on Mar. 9, 2012, 27 pages.

Non-Final Office Action received for U.S. Appl. No. 12/238,342, mailed on Mar. 12, 2014, 17 pages.

Non-Final Office Action received for U.S. Appl. No. 12/333,250, mailed on Aug. 17, 2011, 13 pages.

Non-Final Office Action received for U.S. Appl. No. 12/494,173, mailed on Nov. 28, 2012, 7 pages.

Non-Final Office Action received for U.S. Appl. No. 12/500,911, mailed on Jun. 7, 2012, 17 pages.

Non-Final Office Action received for U.S. Appl. No. 12/545,557, mailed on Jan. 3, 2014, 10 pages.

Non-Final Office Action received for U.S. Appl. No. 12/545,557, mailed on Nov. 23, 2012, 11 pages.

Non-Final Office Action received for U.S. Appl. No. 12/545,604, mailed on Dec. 19, 2013, 17 pages.

Non-Final Office Action received for U.S. Appl. No. 12/545,604, mailed on Jan. 7, 2013, 13 pages.

(56)　　　　　References Cited

OTHER PUBLICATIONS

Non-Final Office Action received for U.S. Appl. No. 12/545,754, mailed on Jan. 2, 2014, 12 pages.

Non-Final Office Action received for U.S. Appl. No. 12/545,754, mailed on Oct. 5, 2012, 10 pages.

Non-Final Office Action received for U.S. Appl. No. 12/545,754, mailed on Sep. 10, 2013, 6 pages.

Non-Final Office Action received for U.S. Appl. No. 12/642,466, mailed on Aug. 28, 2012, 10 pages.

Non-Final Office Action received for U.S. Appl. No. 12/642,466, mailed on May 4, 2015, 10 pages.

Non-Final Office Action received for U.S. Appl. No. 12/642,466, mailed on Nov. 8, 2013, 13 pages.

Non-Final Office Action received for U.S. Appl. No. 12/847,987, mailed on Sep. 6, 2013, 16 pages.

Non-Final Office Action received for U.S. Appl. No. 13/448,182, mailed on Jan. 31, 2014, 18 pages.

Non-Final Office Action received for U.S. Appl. No. 13/448,182, mailed on Oct. 22, 2014, 12 pages.

Non-Final Office Action received for U.S. Appl. No. 13/737,779, mailed on Mar. 29, 2013, 10 pages.

Non-Final Office Action received for U.S. Appl. No. 13/899,391, mailed on Oct. 5, 2015, 11 pages.

Non-Final Office Action received for U.S. Appl. No. 14/055,717, mailed on Apr. 10, 2014, 11 pages.

Non-Final Office Action received for U.S. Appl. No. 14/082,003, mailed on Mar. 13, 2017, 21 pages.

Non-Final Office Action received for U.S. Appl. No. 14/082,003, mailed on May 8, 2015, 26 pages.

Non-Final Office Action received for U.S. Appl. No. 14/082,003, mailed on May 25, 2016, 23 pages.

Non-Final Office Action received for U.S. Appl. No. 14/082,074, mailed on Apr. 10, 2015, 24 pages.

Non-Final Office Action received for U.S. Appl. No. 14/318,157, mailed on Apr. 3, 2018, 12 pages.

Non-Final Office Action received for U.S. Appl. No. 14/318,157, mailed on Dec. 19, 2016, 11 pages.

Non-Final Office Action received for U.S. Appl. No. 14/318,157, mailed on Oct. 6, 2015, 8 pages.

Non-Final Office Action received for U.S. Appl. No. 14/550,686, mailed on Aug. 20, 2015, 11 pages.

Non-Final Office Action received for U.S. Appl. No. 14/550,686, mailed on Dec. 14, 2016, 9 pages.

Non-Final Office Action received for U.S. Appl. No. 14/558,529, mailed on Apr. 14, 2016, 21 pages.

Non-Final Office Action received for U.S. Appl. No. 14/558,529, mailed on Jun. 26, 2017, 6 pages.

Non-Final Office Action received for U.S. Appl. No. 14/615,186, mailed on Jun. 1, 2016, 9 pages.

Non-Final Office Action received for U.S. Appl. No. 14/645,120, mailed on Dec. 16, 2016, 11 pages.

Non-Final Office Action received for U.S. Appl. No. 14/645,120, mailed on Oct. 27, 2015, 9 pages.

Non-Final Office Action received for U.S. Appl. No. 14/993,017, mailed on Dec. 22, 2017, 24 pages.

Non-Final Office Action received for U.S. Appl. No. 14/993,017, mailed on Jan. 18, 2019, 35 pages.

Non-Final Office Action received for U.S. Appl. No. 15/006,987, mailed on Jun. 14, 2017, 15 pages.

Non-Final Office Action received for U.S. Appl. No. 15/009,774, mailed on Jun. 20, 2018, 19 pages.

Non-Final Office Action received for U.S. Appl. No. 15/009,774, mailed on Sep. 4, 2019, 18 pages.

Non-Final Office Action received for U.S. Appl. No. 15/017,463, mailed on May 15, 2019, 20 pages.

Non-Final Office Action received for U.S. Appl. No. 15/017,463, mailed on Sep. 14, 2017, 23 pages.

Non-Final Office Action received for U.S. Appl. No. 15/087,956, mailed on Jan. 18, 2019, 13 pages.

Non-Final Office Action received for U.S. Appl. No. 15/097,179, mailed on Jan. 22, 2018, 12 pages.

Non-Final Office Action received for U.S. Appl. No. 15/144,706, mailed on Apr. 7, 2017, 9 pages.

Non-Final Office Action received for U.S. Appl. No. 15/313,549, mailed on Apr. 23, 2020, 33 pages.

Non-Final Office Action received for U.S. Appl. No. 15/313,549, mailed on Dec. 21, 2018, 14 pages.

Non-Final Office Action received for U.S. Appl. No. 15/313,549, mailed on Jul. 10, 2019, 25 pages.

Non-Final Office Action received for U.S. Appl. No. 15/507,722, mailed on Feb. 11, 2019, 16 pages.

Non-Final Office Action received for U.S. Appl. No. 15/522,737, mailed on Jan. 2, 2019, 14 pages.

Non-Final Office Action received for U.S. Appl. No. 16/152,326, mailed on Apr. 26, 2021, 12 pages.

Non-Final Office Action received for U.S. Appl. No. 16/152,326, mailed on Aug. 14, 2019, 12 pages.

Non-Final Office Action received for U.S. Appl. No. 16/152,326, mailed on Jun. 29, 2020, 10 pages.

Non-Final Office Action received for U.S. Appl. No. 16/201,730, mailed on May 10, 2019, 9 pages.

Non-Final Office Action received for U.S. Appl. No. 16/786,921, mailed on Dec. 10, 2020, 22 pages.

Non-Final Office Action received for U.S. Appl. No. 16/921,817, mailed on Sep. 22, 2021, 24 pages.

Non-Final Office Action received for U.S. Appl. No. 16/924,047, mailed on Sep. 24, 2021, 17 pages.

Non-Final Office Action received for U.S. Appl. No. 17/003,133, mailed on Aug. 3, 2021, 22 pages.

Non-Final Office Action received for U.S. Appl. No. 17/448,879, mailed on Jun. 24, 2022, 19 pages.

Non-Final Office Action received for U.S. Appl. No. 17/805,673, mailed on Jun. 16, 2023, 31 pages.

Notice of Allowability received for U.S. Appl. No. 16/152,326, mailed on Dec. 10, 2021, 3 pages.

Notice of Allowability received for U.S. Appl. No. 16/786,921, mailed on Jul. 16, 2021, 2 pages.

Notice of Allowability received for U.S. Appl. No. 16/921,817, mailed on Mar. 1, 2023, 3 pages.

Notice of Allowance received for U.S. Appl. No. 12/038,760, mailed on Nov. 8, 2013, 15 pages.

Notice of Allowance received for U.S. Appl. No. 12/110,024, mailed on May 23, 2013, 5 pages.

Notice of Allowance received for U.S. Appl. No. 12/110,075, mailed on Aug. 19, 2013, 8 pages.

Notice of Allowance received for U.S. Appl. No. 12/238,333, mailed on Dec. 1, 2015, 10 pages.

Notice of Allowance received for U.S. Appl. No. 12/333,250, mailed on Aug. 28, 2012, 10 pages.

Notice of Allowance received for U.S. Appl. No. 12/494,173, mailed on Oct. 15, 2014, 8 pages.

Notice of Allowance received for U.S. Appl. No. 12/500,911, mailed on Aug. 19, 2013, 7 pages.

Notice of Allowance received for U.S. Appl. No. 12/545,557, mailed on Apr. 11, 2014, 9 pages.

Notice of Allowance received for U.S. Appl. No. 12/545,557, mailed on Jun. 10, 2013, 9 pages.

Notice of Allowance received for U.S. Appl. No. 12/545,604, mailed on Oct. 5, 2015, 9 pages.

Notice of Allowance received for U.S. Appl. No. 12/545,754, mailed on Aug. 21, 2014, 10 pages.

Notice of Allowance received for U.S. Appl. No. 13/448,182, mailed on Jan. 8, 2016, 9 pages.

Notice of Allowance received for U.S. Appl. No. 13/737,779, mailed on Sep. 3, 2013, 11 pages.

Notice of Allowance received for U.S. Appl. No. 14/055,717, mailed on Nov. 7, 2014, 7 pages.

Notice of Allowance received for U.S. Appl. No. 14/082,003, mailed on Oct. 3, 2017, 10 pages.

Notice of Allowance received for U.S. Appl. No. 14/082,003, mailed on Sep. 20, 2017, 9 pages.

(56) References Cited

OTHER PUBLICATIONS

Notice of Allowance received for U.S. Appl. No. 14/312,489, mailed on Mar. 16, 2015, 8 pages.
Notice of Allowance received for U.S. Appl. No. 14/318,157, mailed on Dec. 31, 2018, 8 pages.
Notice of Allowance received for U.S. Appl. No. 14/550,686, mailed on Feb. 9, 2018, 12 pages.
Notice of Allowance received for U.S. Appl. No. 14/558,529, mailed on Oct. 13, 2017, 8 pages.
Notice of Allowance received for U.S. Appl. No. 14/615,186, mailed on Dec. 2, 2016, 7 pages.
Notice of Allowance received for U.S. Appl. No. 14/645,120, mailed on Mar. 1, 2018, 6 pages.
Notice of Allowance received for U.S. Appl. No. 14/993,017, mailed on Jul. 12, 2019, 10 pages.
Notice of Allowance received for U.S. Appl. No. 15/009,774, mailed on Jul. 1, 2020, 6 pages.
Notice of Allowance received for U.S. Appl. No. 15/009,774, mailed on Mar. 20, 2020, 16 pages.
Notice of Allowance received for U.S. Appl. No. 15/087,956, mailed on Mar. 11, 2019, 11 pages.
Notice of Allowance received for U.S. Appl. No. 15/144,706, mailed on Sep. 20, 2017, 9 pages.
Notice of Allowance received for U.S. Appl. No. 15/313,549, mailed on Oct. 21, 2020, 10 pages.
Notice of Allowance received for U.S. Appl. No. 15/507,722, mailed on Feb. 27, 2020, 9 pages.
Notice of Allowance received for U.S. Appl. No. 15/522,737, mailed on Mar. 6, 2020, 8 pages.
Notice of Allowance received for U.S. Appl. No. 15/686,969, mailed on Jan. 2, 2020, 8 pages.
Notice of Allowance received for U.S. Appl. No. 15/687,078, mailed on Apr. 3, 2019, 9 pages.
Notice of Allowance received for U.S. Appl. No. 15/691,283, mailed on Jun. 5, 2019, 10 pages.
Notice of Allowance received for U.S. Appl. No. 16/152,326, mailed on Nov. 26, 2021, 9 pages.
Notice of Allowance received for U.S. Appl. No. 16/786,921, mailed on Jul. 1, 2021, 8 pages.
Notice of Allowance received for U.S. Appl. No. 16/921,817, mailed on Nov. 30, 2022, 9 pages.
Notice of Allowance received for U.S. Appl. No. 16/924,047, mailed on Sep. 21, 2022, 7 pages.
Notice of Allowance received for U.S. Appl. No. 17/003,133, mailed on Feb. 10, 2022, 6 pages.
Notice of Allowance received for U.S. Appl. No. 17/448,879, mailed on Jun. 6, 2024, 5 pages.
Notice of Allowance received for U.S. Appl. No. 17/448,879, mailed on Sep. 25, 2024, 8 pages.
Notice of Allowance received for U.S. Appl. No. 17/805,673, mailed on Mar. 13, 2024, 6 pages.
Notice of Allowance received for U.S. Appl. No. 17/805,673, mailed on Nov. 15, 2023, 10 pages.
Patent Board Decision received for U.S. Appl. No. 11/818,498, mailed on Nov. 2, 2016, 8 pages.
Patent Board Decision received for U.S. Appl. No. 17/448,879, mailed on May 10, 2024, 10 pages.
Pre-Interview First Office Action received for U.S. Appl. No. 15/686,969, mailed on Apr. 4, 2019, 4 pages.
Restriction Requirement received for U.S. Appl. No. 12/238,333, mailed on Mar. 8, 2012, 6 pages.
Restriction Requirement received for U.S. Appl. No. 12/494,173, mailed on Aug. 8, 2012, 5 pages.
Restriction Requirement received for U.S. Appl. No. 13/899,391, mailed on Apr. 8, 2015, 6 pages.
Restriction Requirement received for U.S. Appl. No. 15/087,956, mailed on Feb. 13, 2018, 8 pages.
Restriction Requirement received for U.S. Appl. No. 15/097,179, mailed on Sep. 28, 2017, 6 pages.

Restriction Requirement received for U.S. Appl. No. 15/691,283, mailed on Mar. 5, 2019, 6 pages.
Search Report received for Chinese Patent Application No. 2008201338142, mailed on Jan. 10, 2011, 25 pages (16 pages of English Translation and 9 pages of Official copy).
Search Report received for Chinese Patent Application No. 2009200081997, mailed on Jan. 7, 2011, 14 pages (8 pages of English Translation and 6 pages of Official copy).
Search Report received for Chinese Patent Application No. 201310042816.6, completed on May 18, 2015, 4 pages (2 pages of English Translation and 2 pages of Official copy).
Search Report received for Chinese Patent Application No. 201680008313.9, mailed on Jul. 5, 2019, 4 pages (2 pages English Translation and 2 pages of Official copy).
Search Report received for Chinese Patent Application No. 201910391469.5, mailed on Feb. 16, 2023, 3 pages (1 page of English Translation and 2 pages of Official Copy).
Search Report received for Chinese Patent Application No. 201910391469.5, mailed on Jan. 27, 2022, 5 pages (2 pages of English Translation and 3 pages of Official Copy).
Search Report received for Chinese Patent Application No. 202011300207.2, mailed on Nov. 22, 2023, 6 pages (2 pages of English Translation and 4 pages of Official Copy).
Search Report received for Chinese Patent Application No. ZL2009201524013, completed on Jun. 3, 2011, 20 pages (13 pages of English Translation and 7 pages of Official copy).
Search Report received for Chinese Patent Application No. ZL201020108330.X, completed on Dec. 14, 2011, 20 pages (12 pages of English Translation and 8 pages of Official copy).
Search Report received for European Patent Application No. 08017396.6, mailed on Mar. 19, 2009, 7 pages.
Search Report received for European Patent Application No. 17183937.6, mailed on Jan. 31, 2018, 4 pages.
Search Report received for Great Britain Patent Application No. GB0817242.1, mailed on Jan. 19, 2009, 2 pages.
Search Report received for Great Britain Patent Application No. GB0817242.1, mailed on Jan. 19, 2010, 2 pages.
Search Report received for Netherlands Patent Application No. 2001672, mailed on Apr. 29, 2009, 8 pages.
Search Report received for Taiwanese Patent Application No. 103105965, mailed on Nov. 12, 2015, 2 pages (1 page of English Translation and 1 page of Official copy).
Search Report received for Taiwanese Patent Application No. 103116003, mailed on Oct. 14, 2015, 2 pages (1 page of English Translation and 1 page of Official copy).
Search Report received for Taiwanese Patent Application No. 104115152, mailed on May 3, 2016, 2 pages (1 page of English Translation and 1 page of Official copy).
Supplemental Notice of Allowance received for U.S. Appl. No. 15/686,969, mailed on Feb. 21, 2020, 2 pages.
Supplementary European Search Report received for European Patent Application No. 14902458.0, mailed on Jul. 27, 2017, 4 pages.
Cassidy Robin, "The Tissot T-Touch Watch—A Groundbreaking Timepiece", Ezine Articles, Available online at: <http://ezinearticles.com/?The-Tissot-T-Touch-Watch—A-Groundbreaking-Timepiece &id=. . . >, Feb. 23, 2007, 2 pages.
Gibilisco Stan, "The Illustrated Dictionary of Electronics", Eighth Edition, 2001, 2 pages.
Lee et al., "A Multi-Touch Three Dimensional Touch-Sensitive Tablet", CHI'85 Proceedings, Apr. 1985, pp. 21-25.
Lowe Doug, "Electronics Components: How to Use an Op Amp as a Voltage Comparator", Dummies, Available online at: <https://www.dummies.com/programming/electronics/components/electronics-components-how-to-use-an-op-amp-as-a-voltage-comparator/>, 2012, 9 pages.
Malik et al., "Visual Touchpad: A Two-Handed Gestural Input Device", Proceedings of the 6th International Conference on Multimodal Interfaces, State College, PA, ICMI '04, ACM, Oct. 13-15, 2004, pp. 289-296.
O'Connor Todd, "mTouch Projected Capacitive Touch Screen Sensing Theory of Operation", Microchip TB3064, Microchip Technology Inc., 2010, pp. 1-16.

(56) References Cited

OTHER PUBLICATIONS

Rekimoto J., "SmartSkin: An Infrastructure for Freehand Manipulation on Interactive Surfaces", CHI 2002 Conference Proceedings, Conference on Human Factors in Computing Systems, Minneapolis, vol. 4, No. 1, Apr. 20-25, 2002, pp. 113-120.

Rubine Dean, "Combining Gestures and Direct Manipulation", CHI'92, May 3-7, 1992, pp. 659-660.

Rubine Deanh., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Wilson Andrewd., "Robust Computer Vision-Based Detection of Pinching for One and Two-Handed Gesture Input", ACM, USIT '06, Montreux, Oct. 15-18, 2006, 4 pages.

* cited by examiner

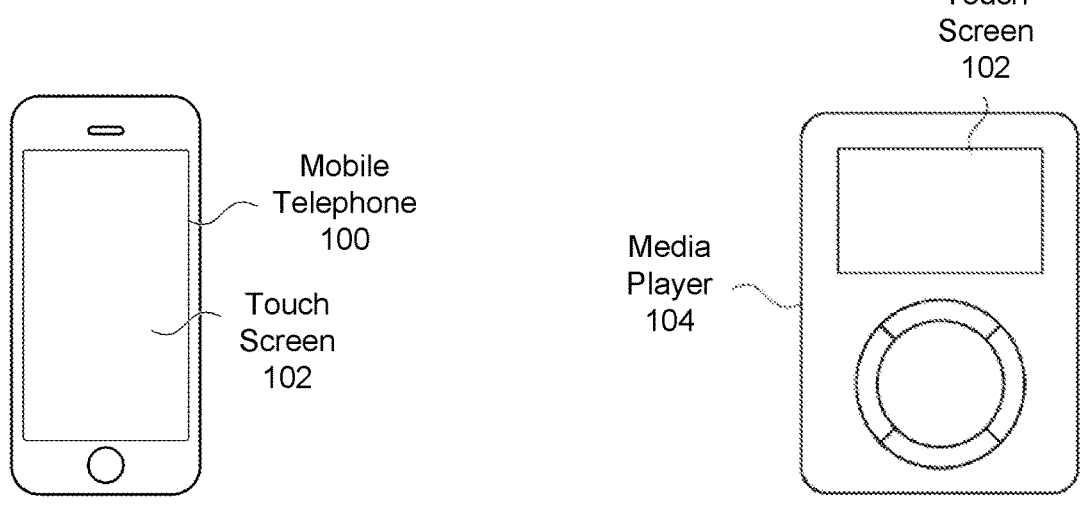
Mobile
Telephone
100
Touch
Screen
102
FIG. 1A
Touch
Screen
102
Media
Player
104
FIG. 1B
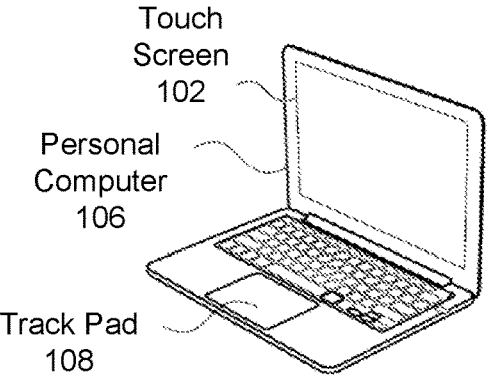
Touch
Screen
102
Personal
Computer
106
Track Pad
108
FIG. 1C
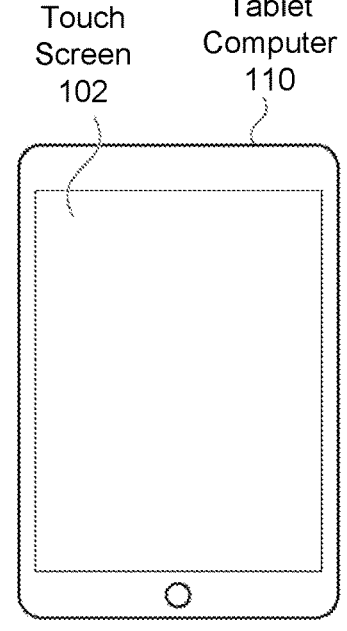
Touch
Screen
102
Tablet
Computer
110
FIG. 1D
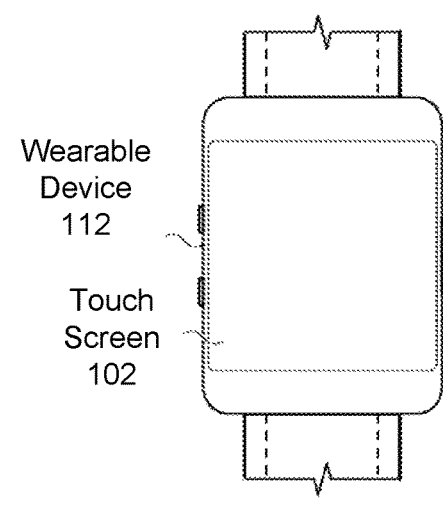
Wearable
Device
112
Touch
Screen
102
FIG. 1E

302A

| | |
|---|---|
| Cover Glass | 354 |
| Polarizer | 352 |
| ITO | 350 |
| uLEDs, Chiplets | 342 |
| Substrate (Metal Routing) | 340 |
| Guard Plane (optional) | 348 |

302B

| | |
|---|---|
| Cover Glass | 354 |
| Polarizer | 352 |
| ITO | 350 |
| uLEDs | 346 |
| Substrate (Metal Routing) | 340 |
| Guard Plane (optional) | 348 |
| Chiplets | 342 |

PIXELATED MUTUAL CAPACITANCE SENSING FOR WATER DETECTION

CROSS-REFERENCE TO RELATED APPLICATIONS

This application claims the benefit of U.S. Provisional Application No. 63/376,641, filed Sep. 22, 2022, the content of which is herein incorporated by reference in its entirety for all purposes.

FIELD OF THE DISCLOSURE

This relates generally to an electronic device including touch and/or proximity sensing, and more particularly to an electronic device configurable for pixelated mutual capacitance sensing to detect the presence of floating water or other liquids.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

In some examples, capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, floating or grounded water (or other liquids) may be detected as a touch, which can cause operational inaccuracies or errors in the computing system that receives inputs from the capacitive touch sensor panel.

SUMMARY OF THE DISCLOSURE

This relates to an electronic device configurable for pixelated mutual capacitance sensing to detect the presence of floating water or other liquids, and optionally to detect the presence of grounded objects. A touch sensor panel, such as an integrated display and touch sensing panel, can be configured in a checkerboard arrangement of alternating drive pixels and sense pixels, where each drive and sense pixel can include a plurality of sub-pixels. The sense pixels can include one or more sense sub-pixels capable of being coupled to a sense circuit for generating a sense signal, and a plurality of grounded sub-pixels located around the sense sub-pixels to reduce the baseline mutual capacitance between the drive and sense pixels. The drive pixels can include a plurality of drive sub-pixels capable of being configured to receive a stimulation signal.

The drive pixels adjacent to a sense pixel can be stimulated with a stimulation signal. The stimulated drive pixels can capacitively couple onto the sense sub-pixels of the sense pixel, forming a baseline (no touch) mutual capacitance between the drive pixels and the sense sub-pixels in the absence of a proximate object. The stimulated drive pixels can also capacitively couple to the grounded sub-pixels in the sense pixel, shunting some charge from the drive pixels to ground and reducing the baseline mutual capacitance between the drive pixels and the sense sub-pixel. The sense signal on the sense sub-pixel can be received by a sense circuit and demodulated at the same frequency as the stimulation signal to generate a signal indicative of the mutual capacitance between the drive pixels and the sense sub-pixel.

When a grounded object such as a finger is located in proximity to one or more of the drive pixels and the sense pixel, some of the charge coupling between the one or more drive pixels and the sense pixel is shunted to ground via the grounded object, resulting in a reduction in the mutual capacitance between the one or more drive pixels and the sense pixel. In contrast, when a floating water droplet is located in proximity to one or more of the drive pixels and the sense pixel, the floating water droplet provides a capacitive path from the one or more drive pixels, to the floating water droplet, and to the sense pixel. The additional capacitive path is in parallel with the baseline mutual capacitance between the drive pixels and the sense pixel, resulting in an increase in the mutual capacitance between the one or more drive pixels and the sense pixel. These changes to the mutual capacitance between the one or more drive pixels and the sense pixel can be seen at the output of the sense circuit and processed by one or more processors. Because floating water increases mutual capacitance while a grounded object decreases mutual capacitance, floating water can be distinguished from a grounded touch based on the direction of the change in mutual capacitance.

BRIEF DESCRIPTION OF THE DRAWINGS

FIGS. 1A-1E illustrate systems in which pixelated mutual capacitance (PMC) sensing can be employed to detect floating water according to examples of the disclosure.

DETAILED DESCRIPTION

Figure 2:
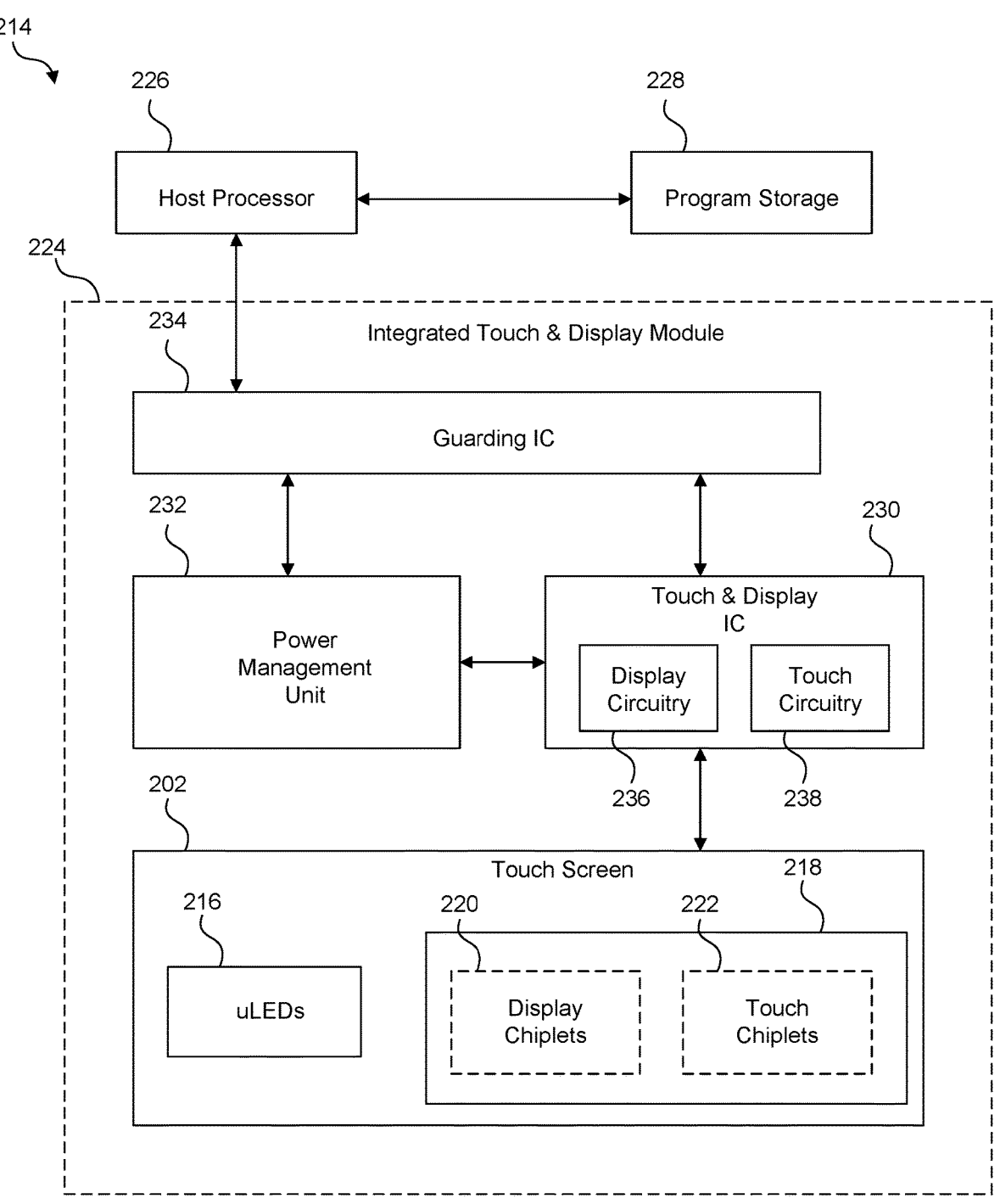
FIG. 2 is a block diagram of a computing system that illustrates one implementation of an integrated touch screen where pixelated mutual capacitance sensing can be employed to detect floating water according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to an electronic device configurable for pixelated mutual capacitance sensing to detect the presence of floating water or other liquids, and optionally to detect the presence of grounded objects. A touch sensor panel, such as an integrated display and touch sensing panel, can be configured in a checkerboard arrangement of alternating drive pixels and sense pixels, where each drive and sense pixel can include a plurality of sub-pixels. The sense pixels can include one or more sense sub-pixels capable of being coupled to a sense circuit for generating a sense signal, and a plurality of grounded sub-pixels located around the sense sub-pixels to reduce the baseline mutual capacitance between the drive and sense pixels. The drive pixels can include a plurality of drive sub-pixels capable of being configured to receive a stimulation signal.

The drive pixels adjacent to a sense pixel can be stimulated with a stimulation signal. The stimulated drive pixels can capacitively couple onto the sense sub-pixels of the sense pixel, forming a baseline (no touch) mutual capacitance between the drive pixels and the sense sub-pixels in the absence of a proximate object. The stimulated drive pixels can also capacitively couple to the grounded sub-pixels in the sense pixel, shunting some charge from the drive pixels to ground and reducing the baseline mutual capacitance between the drive pixels and the sense sub-pixel. The sense signal on the sense sub-pixel can be received by a sense circuit and demodulated at the same frequency as the stimulation signal to generate a signal indicative of the mutual capacitance between the drive pixels and the sense sub-pixel.

When a grounded object such as a finger is located in proximity to one or more of the drive pixels and the sense pixel, some of the charge coupling between the one or more drive pixels and the sense pixel is shunted to ground via the grounded object, resulting in a reduction in the mutual capacitance between the one or more drive pixels and the sense pixel. In contrast, when a floating water droplet is located in proximity to one or more of the drive pixels and the sense pixel, the floating water droplet provides a capacitive path from the one or more drive pixels, to the floating water droplet, and to the sense pixel. The additional capacitive path is in parallel with the baseline mutual capacitance between the drive pixels and the sense pixel, resulting in an increase in the mutual capacitance between the one or more drive pixels and the sense pixel. These changes to the mutual capacitance between the one or more drive pixels and the sense pixel can be seen at the output of the sense circuit and processed by one or more processors. Because floating water increases mutual capacitance while a grounded object decreases mutual capacitance, floating water can be distinguished from a grounded touch based on the direction of the change in mutual capacitance.

FIGS. 1A-1E illustrate systems in which pixelated mutual capacitance sensing can be employed to detect floating water according to examples of the disclosure. FIG. 1A illustrates mobile telephone 100 that includes integrated touch screen 102 capable of performing pixelated mutual capacitance sensing to detect floating water according to examples of the disclosure. FIG. 1B illustrates digital media player 104 that includes integrated touch screen 102 capable of performing pixelated mutual capacitance sensing to detect floating water according to examples of the disclosure. FIG. 1C illustrates personal computer 106 that includes a trackpad 108 and integrated touch screen 102 capable of performing pixelated mutual capacitance sensing to detect floating water according to examples of the disclosure. FIG. 1D illustrates tablet computer 110 that includes integrated touch screen 102 capable of performing pixelated mutual capacitance sensing to detect floating water according to examples of the disclosure. FIG. 1E illustrates wearable device 112 (e.g., a watch) that includes integrated touch screen 102 capable of performing pixelated mutual capacitance sensing to detect floating water according to examples of the disclosure. It is understood that the above integrated touch screens can be implemented in other devices as well. Additionally it should be understood that although the disclosure herein primarily focuses on integrated touch screens, some of the disclosure is also applicable to touch sensor panels without a corresponding display.

In some examples, touch screen 102 can be based on self-capacitance, or be configurable to operate, at times, as self-capacitance touch systems. A self-capacitance based touch system can include a matrix of small, individual plates of conductive material or groups of individual plates of conductive material forming larger conductive regions that can be referred to as touch node electrodes. For example, a touch screen can include a plurality of individual touch node electrodes, each touch node electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screen 102 can be based on mutual capacitance, or be configurable to operate, at times, as mutual-capacitance touch systems. A mutual capacitance based touch system can include electrodes arranged as drive and sense lines that may cross over each other on different layers, or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screen 102 can be based on mutual capacitance and/or self-capacitance. The electrodes can be arranged as a matrix of small, individual plates of conductive material or as drive lines and sense lines, or in another pattern. The electrodes can be configurable for mutual capacitance or self-capacitance sensing or a combination of mutual and self-capacitance sensing, or they can be configured to operate as mutual or self capacitance sensors at different times. For example, in one mode of operation, electrodes can be configured to sense mutual capacitance between electrodes, and in a different mode of operation electrodes can be configured (in some instances at different times in a scan plan) to sense self-capacitance of electrodes. In some examples, some of the electrodes can be configured to sense mutual capacitance therebetween and some of the electrodes can be configured to sense self-capacitance at the same time.

FIG. 2 is a block diagram of computing system 214 that illustrates one implementation of integrated touch screen 202 where pixelated mutual capacitance sensing can be employed to detect floating water according to examples of the disclosure. As described in more detail herein, integrated touch screen 202 can include light emitting diodes (LEDs) or organic light emitting diodes (OLEDs) represented by micro-LEDs 216 and chiplets 218 (e.g., integrated chiplets including LED/OLED drivers, touch sensing circuitry and/or optical sensing circuitry). In some examples, the functionality of chiplets can be divided into separate display chiplets 220 (e.g., including LED/OLED drivers) and touch chiplets 222 (e.g., including touch sensing circuitry and/or optical sensing circuitry). Computing system 214 can be included in, for example, mobile telephone 100, digital media player 104, personal computer 106, tablet computer 110, or wearable device 112 as shown in FIGS. 1A-1E, or any mobile or non-mobile computing device that includes a touch screen. Computing system 214 can include integrated touch and display module 224, host processor 226 (which can include one or more processors) and program storage 228. Integrated touch and display module 224 can include integrated touch screen 202 and integrated circuits for operation of integrated touch screen 202. In some examples, integrated touch and display module 224 can be formed on a single substrate with micro-LEDs 216 and chiplets 218 (or display chiplets 220 and/or touch chiplets 222) of integrated touch screen 202 on one side of the touch screen and integrated circuits controlling operation of micro-LEDs 216 and chiplets 218 mounted on an opposite side of the single substrate. Forming integrated touch and display module 224 in this way can provide for simplified manufacturing and assembly of devices with a touch screen. In some examples, the integrated touch and display module 224 can be formed on a single substrate with micro-LEDs 216 on one side of the substrate and chiplets 218 (or display chiplets 220 and/or touch chiplets 222) of integrated touch screen 202 and integrated circuits controlling operation of micro-LEDs 216 and chiplets 218 mounted on an opposite side of the single substrate.

Integrated circuits for operation of integrated touch screen 202 can include an integrated touch and display integrated circuit (IC) (touch and display controller) 230, a power management unit (PMU) 232, and optionally a guard integrated circuit (guard IC) 234. (Self-capacitance touch sensing performance can be improved (and parasitic capacitance effects reduced) by performing touch sensing operations in a different power domain than in the chassis power domain.) In some examples, guard IC 234 can be used to operate integrated touch and display module 224 in a guard power domain during guarded touch operation and operate touch and display module 224 in the chassis power domain otherwise (e.g., during non-guarded touch operations or during display operations). Power management unit 232 can be an integrated circuit configured to provide the voltages necessary for the touch and display controller 230, including guard-referenced power supplies when operating in a guarded power domain. The touch and display controller 230 can include circuitry to perform touch sensing, optical sensing and display operations. Although illustrated in FIG. 2 as a single integrated circuit, the various components and/or functionality of the touch and display controller 230 can be implemented with multiple circuits, elements, chips, and/or discrete components (e.g., a separate touch integrated circuit and a separate display integrated circuit with an integrated circuit to handle the handoff between the two).

The touch and display controller 230 can include display circuitry 236 to perform display operations. Display circuitry 236 can include hardware to process one or more still images and/or one or more video sequences for display on integrated touch screen 202. The display circuitry 236 can be configured to generate read memory operations to read the data representing the frame/video sequence from a memory (not shown) through a memory controller (not shown), for example, or can receive the data representing the frame/video sequence from host processor 226. The display circuitry 236 can be configured to perform various processing on the image data (e.g., still images, video sequences, etc.). In some examples, the display circuitry 236 can be configured to scale still images and to dither, scale and/or perform color space conversion on the frames of a video sequence. Display circuitry 236 can be configured to blend the still image frames and the video sequence frames to produce output frames for display. The display circuitry 236 can also be more generally referred to as a display controller, display pipe, display control unit, or display pipeline. The display control unit can be generally any hardware and/or firmware configured to prepare a frame for display from one or more sources (e.g., still images and/or video sequences). More particularly, the display circuitry 236 can be configured to retrieve source frames from one or more source buffers stored in memory, composite frames from the source buffers, and display the resulting frames on integrated touch screen 202. Accordingly, the display circuitry 236 can be configured to read one or more source buffers and composite the image data to generate the output frame. Display circuitry 236 can provide various control and data signals to the display via chiplets 218 (or via display chiplets 220), including timing signals (e.g., one or more clock signals) and pixel selection signals. The timing signals can include a pixel clock that can indicate transmission of a pixel. The data signals can include color signals (e.g., red, green, blue) for micro-LEDs 216. The display circuitry can control integrated touch screen 202 in real-time, providing the data indicating the pixels to be displayed as the touch screen is displaying the image indicated by the frame. The interface to such an integrated touch screen 202 can be, for example, a video graphics array (VGA) interface, a high definition multimedia interface (HDMI), a mobile industry processor interface (MIPI), a digital video interface (DVI), a LCD/LED/OLED interface, a plasma interface, or any other suitable interface.

The touch and display controller 230 can include touch circuitry 238 to perform touch operations. Touch circuitry 238 can include one or more touch processors, peripherals (e.g., random access memory (RAM) or other types of memory or storage, watchdog timers and the like), and a touch controller. The touch controller can include, but is not limited to, channel scan logic (e.g., implemented in programmable logic circuits or as discrete logic circuits) which can provide configuration and control for touch sensing operations by chiplets 218 (or by touch chiplets 222). For example, touch chiplets 222 can be configured to drive, sense and/or ground touch node electrodes depending on the mode of touch sensing operations. Additionally or alternatively, the chiplets 218 (or touch chiplets 222) can be configured for optical sensing (e.g., using touch circuitry 238 of touch and display controller 230 or using separate circuitry and a separate controller for optical sensing operations). The mode of touch sensing and/or optical sensing operations can, in some examples, be determined by a scan plan stored in memory (e.g., RAM) in touch circuitry 238. The scan plan can provide a sequence of scan events to perform during a frame. The scan plan can also include information necessary for providing control signals to and programming chiplets 218 for the specific scan event to be performed, and for analyzing data from chiplets 218 according to the specific scan event to be performed. The scan events can include, but are not limited to, a mutual capacitance scan, a self-capacitance scan, a stylus scan, touch spectral analysis scan, a stylus spectral analysis scan, and an optical sensing scan. The channel scan logic or other circuitry in touch circuitry 238 can provide the stimulation signals at various frequencies and phases that can be selectively applied to the touch node electrodes of integrated touch screen 202 or used for demodulation, as described in more detail below. The touch circuitry 238 can also receive touch data from the chiplets 218 (or touch chiplets 222), store touch data in memory (e.g., RAM), and/or process touch data (e.g., by one or more touch processors or touch controller) to determine locations of touch and/or clean operating frequencies for touch sensing operations (e.g., spectral analysis). The touch circuitry 238 (or separate optical sensing circuitry) can also receive ambient light data from the chiplets 218 (or touch chiplets 222), store ambient light data in memory (e.g., RAM), and/or process ambient light data (e.g., by one or more touch processors or touch controller or an optical sensing processor/controller) to determine ambient light conditions.

Integrated touch screen 202 can be used to derive touch data at multiple discrete locations of the touch screen, referred to herein as touch nodes. For example, integrated touch screen 202 can include touch sensing circuitry that can include a capacitive sensing medium having a plurality of electrically isolated touch node electrodes. Touch node electrodes can be coupled to chiplets 218 (or touch chiplets 222) for touch sensing by sensing channel circuitry. As used herein, an electrical component "coupled to" or "connected to" another electrical component encompasses a direct or indirect connection providing electrical path for communication or operation between the coupled components. Thus, for example, touch node electrodes of integrated touch screen 202 may be directly connected to chiplets 218 or indirectly connected to chiplets 218 (e.g., connected to touch chiplets 222 via display chiplets 220), but in either case provided an electrical path for driving and/or sensing the touch node electrodes. Labeling the conductive plates (or groups of conductive plates) used to detect touch as touch node electrodes corresponding to touch nodes (discrete locations of the touch screen) can be particularly useful when integrated touch screen 202 is viewed as capturing an "image" of touch (or "touch image"). The touch image can be a two-dimensional representation of values indicating an amount of touch detected at each touch node electrode corresponding to a touch node in integrated touch screen 202. The pattern of touch nodes at which a touch occurred can be thought of as a touch image (e.g., a pattern of fingers touching the touch screen). In such examples, each touch node electrode in a pixelated touch screen can be sensed for the corresponding touch node represented in the touch image.

Host processor 226 can be connected to program storage 228 to execute instructions stored in program storage 228 (e.g., a non-transitory computer-readable storage medium). Host processor 226 can provide, for example, control and data signals so that touch and display controller 230 can generate a display image on integrated touch screen 202, such as a display image of a user interface (UI). Host processor 226 can also receive outputs from touch and display controller 230 (e.g., touch inputs from the one or more touch processors, ambient light information, etc.) and performing actions based on the outputs. The touch input can be used by computer programs stored in program storage 228 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 226 can also perform additional functions that may not be related to touch processing, optical sensing, and display.

Note that one or more of the functions described herein, including the configuration and operation of chiplets, can be performed by firmware stored in memory (e.g., one of the peripherals in touch and display controller 230) and executed by one or more processors (in touch and display controller 230), or stored in program storage 228 and executed by host processor 226. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 214 is not limited to the components and configuration of FIG. 2, but can include other or additional components in multiple configurations according to various examples. Additionally, the components of computing system 214 can be included within a single device, or can be distributed between multiple devices. In some examples, PMU 232 and guard IC 234 can be integrated into a power management and guard integrated circuit. In some examples, the power management and guard integrated circuit can provide power supplies (e.g., guard referenced) and the guard signal to touch screen 202 directly rather than via touch and display IC 230. In some examples, touch and display IC 230 can be coupled to host processor 226 directly, and a portion of touch and display IC 230 in communication with chiplets 218 can be included in an isolation well (e.g., a deep N-well isolation) referenced to the guard signal from guard IC 234. In some examples, computing system 214 can include an energy storage device (e.g., a battery). In some examples, computing system 214 can include wired or wireless communication circuitry (e.g., Bluetooth, WiFi, etc.).

Integrated touch screen 202 can be fabricated such that touch sensing circuit elements of the touch sensing system can be integrated with the display stack-up and some circuit elements can be shared between touch and display operations. It is noted that circuit elements are not limited to whole circuit components, such as a whole capacitor, a whole transistor, etc., but can include portions of circuitry, such as a conductive plate or metal routing.

Figure 3A:
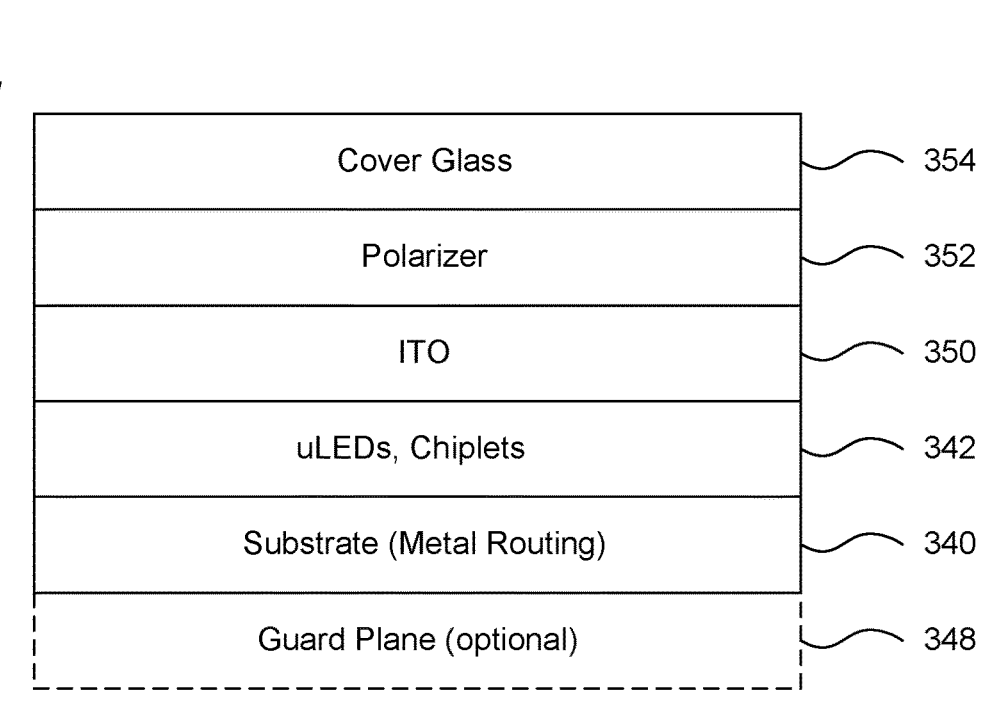
FIGS. 3A-3B illustrate stack-ups of an integrated touch screen where pixelated mutual capacitance sensing can be employed to detect floating water according to examples of the disclosure.
Figure 3B:
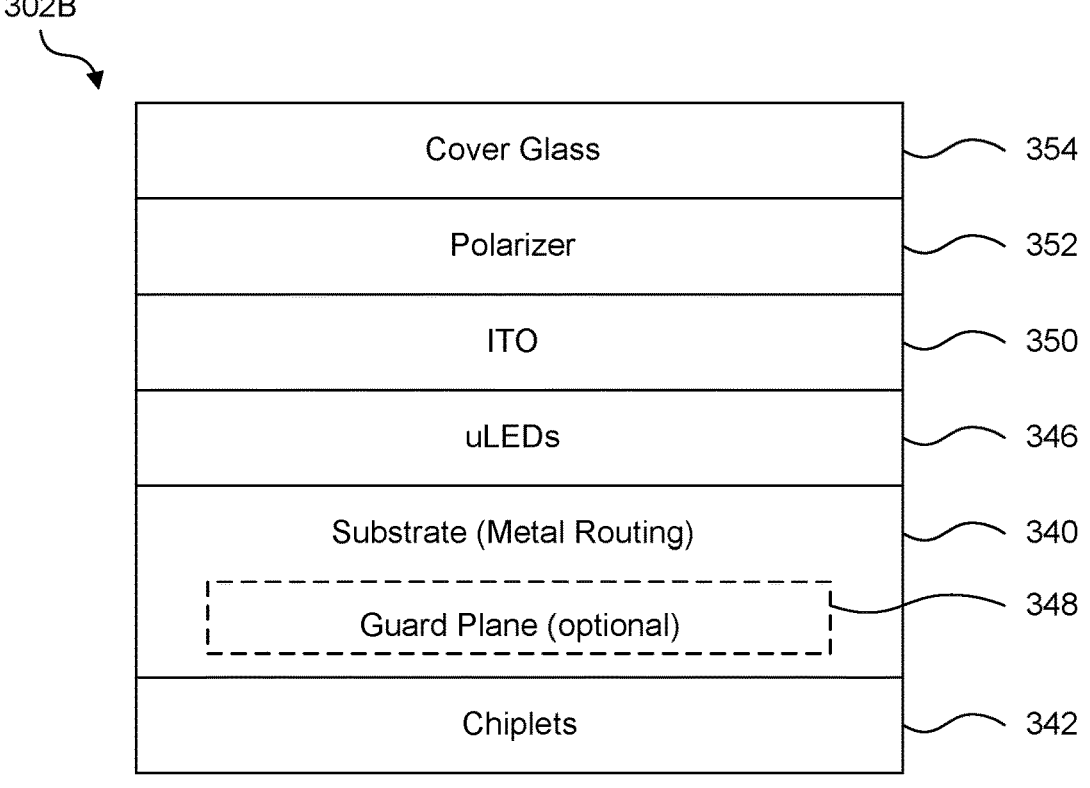

FIGS. 3A-3B illustrate stack-ups of an integrated touch screen where pixelated mutual capacitance sensing can be employed to detect floating water according to examples of the disclosure. FIG. 3A illustrates an example stack-up of a touch screen including chiplets (or touch chiplets and display chiplets) in the visible area of the display. Integrated touch screen 302A comprises a substrate 340 (e.g., a printed circuit board) upon which chiplets (or touch chiplets and/or display chiplets) and micro-LEDs can be mounted in a touch and display circuit layer 342. In some examples, the chiplets and/or micro-LEDs can be partially or fully embedded in the substrate (e.g., the components can be placed in depressions in the substrate). In some examples, the chiplets can be mounted on one and/or both sides of substrate 340. For example, some or all of the chiplets can be mounted on a second side of substrate 340 (or some or all of the touch chiplets and/or some or all of the display chiplets can be mounted on a second side of substrate 340). In some examples, the chiplets can be disposed on the second side of the substrate (opposite the first side of the substrate including micro-LEDs). FIG. 3B illustrates an example stack-up of a touch screen 302B including chiplets (or touch chiplets and/or display chiplets) outside the visible area of the display. Unlike the stack-up of integrated touch screen 302A, in which chiplets and micro-LEDs can be mounted in touch and display circuit layer 342, stack-up of integrated touch screen 302B can include chiplets mounted in a touch and display circuit layer 342 on a second (bottom) side of substrate 340 different than the micro-LEDs mounted on in a display pixel layer 346 on a first (top, visible) side of substrate 340. In some examples, placing the chiplets on the second side of the substrate can allow for uniform spacing of the micro-LEDs and/or increased density of micro-LEDs on the first side of substrate 340.

The substrate 340 can include routing traces in one or more layers to route signals between micro-LEDs, chiplets and a touch and display controller. Substrate 340 can also optionally include a guard plane 348 for guarded operation (e.g., corresponding to guard plane 348 in FIG. 3A). Although illustrated on the bottom of substrate 340 in FIG. 3A, guard plane 348 can be formed as a layer of substrate 340 other than the bottom layer (e.g., as illustrated in FIG. 3B in an internal layer of substrate 340).

After mounting micro-LEDs and chiplets in the touch and display circuit layer 342 in FIG. 3A (e.g., during a pick-and-place assembly), a planarization layer (e.g., transparent epoxy) can be deposited over the micro-LEDs and chiplets. The planarization layer can be deposited over the micro-LEDs in the display pixel layer 346 in the stack-up of FIG. 3B. A fully or partially transparent conductor layer 350 (e.g., ITO) can be deposited above planarized touch and display circuit layer 342 in FIG. 3A or above the display pixel layer 346 in FIG. 3B. Conductor layer 350 can include a pattern of individual conductor plates that can be used for touch and display functions of integrated touch screens 302A or 302B. For example, individual conductor plates can be used as cathode terminals for micro-LEDs during display operations (and/or optical sensing operations) and groups of conductor plates can form touch node electrodes for touch operations. Polarizer 352 can be disposed above the transparent conductor layer 350 (optionally with another planarization layer disposed over the transparent conductor layer 350). Cover glass (or front crystal) 354 can be disposed over polarizer 352 and form the outer surface of integrated touch screen 302. The stack-up of integrated touch screens 302A and/or 302B can provide numerous benefits including reduced costs (e.g., due to simplified assembly of devices including the integrated touch and display module and a reduced number of integrated circuits by combining touch and display functionality into integrated touch and display controller), reduced stack-up height (sharing conductors eliminates a separate touch node electrode layer; integrating chiplets (or touch chiplets and display chiplets) into the stack-up on the same layer with the micro-LEDs does not add to the stack-up height for FIG. 3A), simplified support for guarded self-capacitance scans (by including touch circuitry on the integrated touch and display module with a guard plane extending throughout the substrate of the integrated touch and display module), and shrinking the border region around the touch screen (because routing can be done through the substrate rather than in the border regions).

Figure 4:
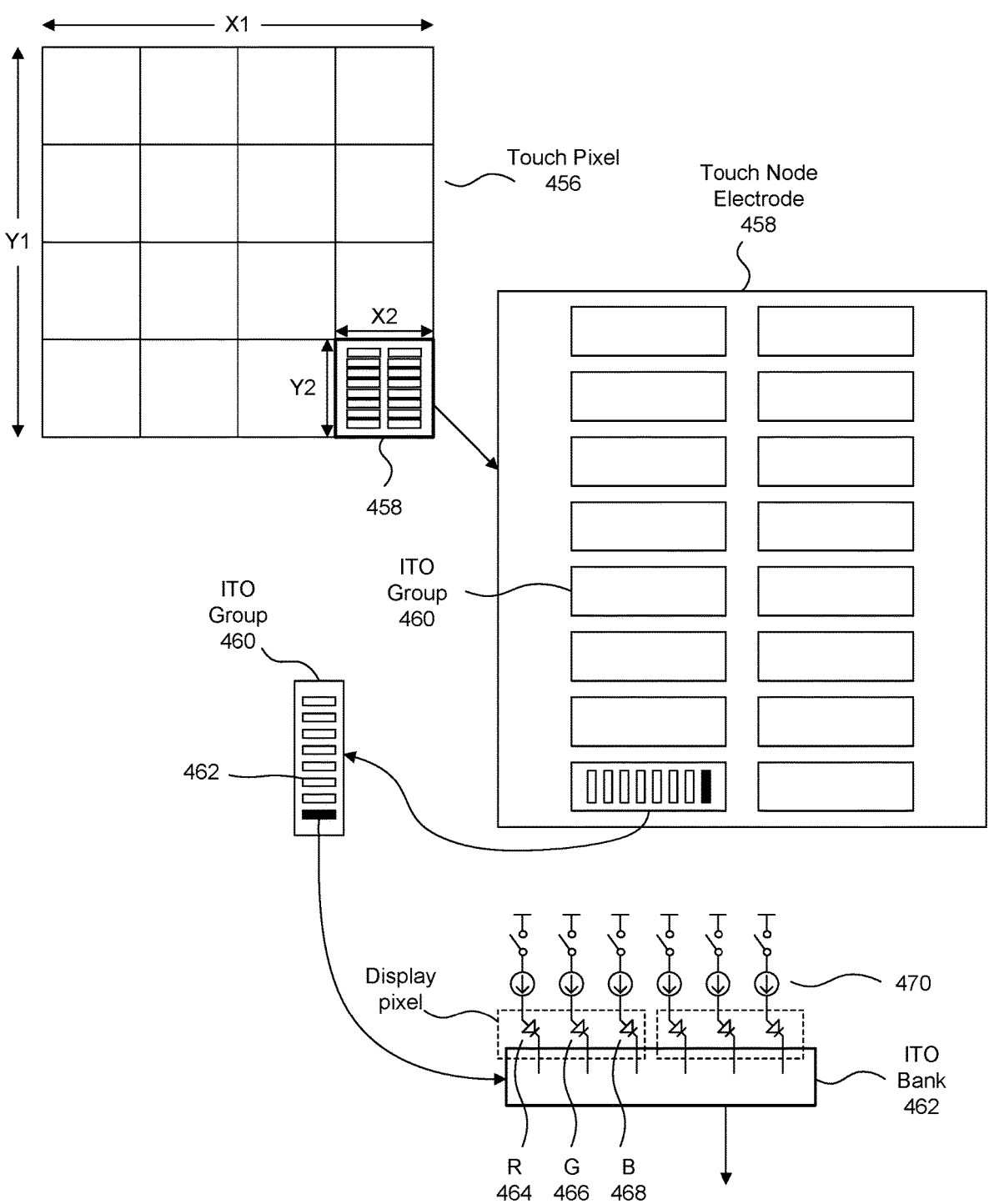
FIG. 4 illustrates a portion of a conductive layer and corresponding circuitry of a portion of an example touch and display circuit layer where pixelated mutual capacitance sensing can be employed to detect floating water according to examples of the disclosure.

FIG. 4 illustrates a portion of a conductive layer and corresponding circuitry of a portion of an example touch and display circuit layer where pixelated mutual capacitance sensing can be employed to detect floating water according to examples of the disclosure. An integrated touch screen can include a conductive layer (e.g., corresponding to conductive layer 350 in FIG. 3A or 3B), a portion of which is shown in FIG. 4 as touch pixel 456. Touch pixel 456 can define a region having an area X1 by Y1 (e.g., 5 mm×5 mm) including 16 touch node electrodes 458, although in other examples, different numbers of touch node electrodes can be employed. Each touch node electrode 458 can be formed from 16 ITO groups 460 (e.g., eight rows, two columns in the orientation of FIG. 4, or two groups of eight rows in a single column in other orientations) and can define an area X2 by Y2 (e.g., 1.25 mm×1.25 mm) smaller than X1 by Y1, although in other examples, different numbers of ITO groups, and different numbers of rows and columns can also be employed. In some examples, as described herein, touch can be measured using touch chiplets for some or all of the smaller regions (e.g., touch node electrodes 458 having an area X2 by Y2). In some examples, as described herein, the touch image used for determining touch input from the user to the integrated touch screen can combine these touch measurements for some or all of the smaller regions into a touch image with a lower resolution corresponding to the larger regions (e.g., touch pixels having an area X1 by Y1).

FIG. 4 also illustrates an expanded view of touch node electrode 458 showing component ITO banks 462 of ITO groups 460 and touch and display circuitry (e.g., corresponding to components of touch and display circuit layer 342), according to some examples. The touch and display circuitry can include micro-LEDs 464, 466, 468, display chiplets, and touch chiplets (not shown), although in other examples, LEDs other than micro-LEDs can also be employed, and chiplets need not be utilized. Touch node electrode 458 of FIG. 4 includes 128 ITO banks 462 (i.e., eight ITO banks 462 per ITO group 460), although in other examples, different numbers of ITO banks can also be used). In some examples, each ITO bank can be formed over a bank of micro-LEDs and can serve as the cathode terminal for the bank of micro-LEDs during display operations, and can be coupled to one or more display chiplets to update the micro-LEDs in the corresponding ITO group. As illustrated in FIG. 4, each ITO bank 462 can serve as a cathode for two display pixels (e.g., each including red, green and blue sub-pixels). In some examples, each ITO bank 462 can serve as the cathode for more or fewer display pixels.

During a touch operation, in some examples ITO banks 462 can be coupled together to form touch node electrode 458, and touch node electrode 458 can be coupled to one or more touch chiplets (not shown) for touch sensing operations.

The one or more display chiplets can include display micro-drivers 470 as shown in FIG. 4. Display micro-drivers 470 can be coupled to one or more red, green, and blue LED/OLED devices 464, 466, 468 such as micro-LEDs that emit red, green and blue light, respectively. The RGB arrangement is exemplary and other examples may include alternative sub-pixel arrangements (e.g., red-green-blue-yellow (RGBY), red-green-blue-yellow-cyan (RGBYC), or red-green-blue-white (RGBW), or other sub-pixel matrix schemes where the pixels may have a different number of sub-pixels). As illustrated in the example of FIG. 4, micro-drivers 470 within a display chiplet within ITO group 460 can be coupled to an eight row, two column array of pixels. Each row of the array can correspond to ITO bank 462. ITO bank 462 can serve as a cathode node when selected by switching circuitry, for example. The cathode nodes can be connected to a voltage, Vneg, during display operations. Display micro-drivers 470 can include current drivers coupled to the anodes of sub-pixel elements in the two columns of pixels. For example, the anode of each blue sub-pixel in the first column of pixels can be coupled together and to one of the current drivers, and the anode of each blue sub-pixel in the second column of pixels can be coupled together and to a different one of the current drivers. Likewise, the anode of each green sub-pixel or red sub-pixel in the first and second columns of pixels can be respectively coupled together and to respective current sources. Thus, during display operations, selecting one of the ITO banks 462 using one or more switches and adjusting and providing the operating current of respective current drivers in display micro-drivers can address the illumination adjustment for each pixel in ITO group 460. In some examples, refresh and/or timing signals can be provided by the touch and display controller to address each LED device individually, to enable asynchronous or adaptively synchronous display updates. In some examples, display brightness can be adjusted by manipulation of reference voltages (not shown) supplied to the display micro-drivers.

As described above, during display operations, one or more switches can select a respective bank (e.g., a multiplexer or corresponding group of discrete switches can be used to select one of the ITO banks) to couple to the cathode node, which is in turn coupled to Vneg by other switches. During touch operations by an integrated touch screen, one or more switches can instead couple together each of the ITO banks 462 in ITO group 460, and couple ITO group 460 to a touch chiplet. Additionally, one or more switches can be configured so that the anode and cathode of the LED devices can be shorted to avoid any noise from the LEDs (e.g., leakage current or photocurrents) interfering with touch sensing. Additionally, multiple ITO groups corresponding to multiple display chiplets can be coupled together to form touch node electrodes, and be coupled to one or more touch chiplets.

As mentioned above, ITO banks 462 can be coupled together to form touch node electrodes for touch sensing operations. In some examples, ITO banks 462 coupled to a chiplet can be coupled together using switching circuitry within the chiplet to form a touch electrode. In some examples, groups of ITO banks can be coupled together using the display chiplets to form touch node electrodes for touch sensing operations. Each of the touch node electrodes formed from the groups of ITO banks can be coupled during touch operations to one of the touch chiplets.

In some examples, the number of ITO banks 462 in a touch node electrode can be selected according to the desired sensing resolution. In some examples, the number of ITO banks 462 in a touch node may be limited by space available for chiplets, which can be a function of the density of LEDs/display pixels.

As noted above, in some examples, ITO groups 460 can be coupled to both display chiplets and touch chiplets. The touch chiplets can include sensing circuitry (also referred to herein as a sense channel or sensing channel circuitry), switching circuitry, and control circuitry. The sensing circuitry can be configured to be coupled to ITO groups 460 for sensing operations. The switching circuitry can include switches (e.g., multiplexers, discrete switches, etc.) to enable display and sensing configurations described herein. For example, the switches can include ITO switches (cathode switches), anode switches, and stimulation voltage switches for coupling touch node electrodes to positive or negative phase stimulation signals for touch sensing operations. The control circuitry can include interface and register circuitry providing input and output functionality to enable communications between the touch chiplet and a controller and/or host processor and for storing configuration information for the chiplet (e.g., configurations for the sense channel circuitry). The control circuitry can also include switch control logic circuitry configured to operate the switching circuitry for display and sensing operations.

As noted above, in some cases, floating or grounded water (or other liquids) may be detected as a touch, which can cause operational errors in the computing system that receives inputs from the capacitive touch sensor panel. Thus, various configurations of ITO groups can be employed to detect floating water so that the effect of the water can be removed from touch sensing operations, or in some instances provide for additional features that rely upon the detection of floating water.

Figure 5:
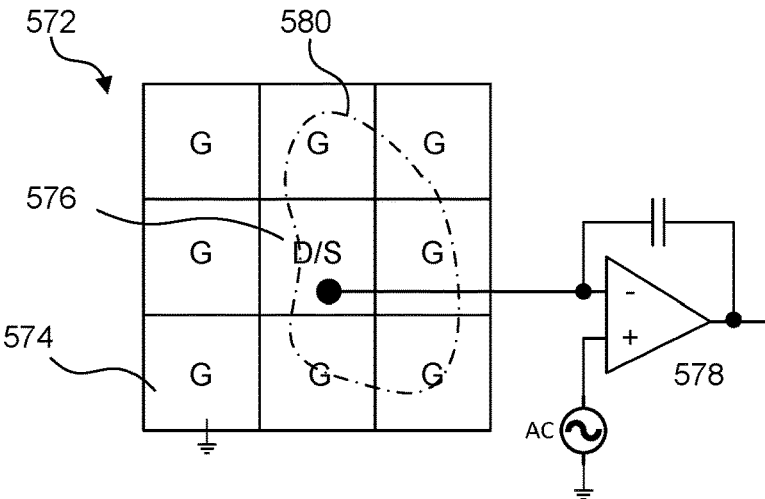
FIG. 5 illustrates a non-bootstrapped (NBS) touch pixel configuration that can be configured for performing an NBS scan to provide for the detection of floating water according to examples of the disclosure.

FIG. 5 illustrates a non-bootstrapped (NBS) touch pixel configuration 572 that can be configured for performing an NBS scan to provide for the detection of floating water according to examples of the disclosure. In the example of FIG. 5, eight grounded touch pixels 574 (labeled "G") surround a self-capacitance touch pixel 576 (labeled "D/S"), although it should be understood that FIG. 5 only represents a small portion of a larger repeating touch pixel configuration, and that other configurations of sparse self-capacitance touch pixels surrounded by grounded touch pixels can also be employed. In some examples, each touch pixel 574 and 576 can correspond to touch pixel 456 described above with respect to FIG. 4. The touch pixels in FIG. 5 can be configured using the switching circuitry described above such that the self-capacitance touch pixel 576 is coupled to an analog front end (AFE) 578, which is configured to receive a stimulation signal for self-capacitance sensing at its noninverting input and both drive and sense the self-capacitance touch pixel at its inverting input. The switching circuitry can also be configured to couple the eight grounded touch pixels 574 to a system ground.

When a grounded object such as a finger (not shown) appears at least partially over self-capacitance touch pixel 576, a capacitive path to ground can be formed from the self-capacitance touch pixel to the ground through the grounded object. The capacitive path causes a flow of charge to ground and a resultant increase in the self-capacitance of self-capacitance touch pixel 576. This increase in self-capacitance can be detected by AFE 578, and thus the grounded object can be detected and distinguished from a no-touch condition. When floating water droplet 580 appears at least partially over self-capacitance touch pixel 576 and at least partially over at least one grounded touch pixel 574, a capacitive path to ground can be formed from the self-capacitance touch pixel to the water droplet to the grounded touch pixel. The capacitive path causes a flow of charge to ground and a resultant increase in the self-capacitance of self-capacitance touch pixel 576. This increase in self-capacitance can be detected by AFE 578, and thus floating water droplet 580 can be detected and distinguished from a no-touch condition, though it may be difficult to distinguish from the touch of a grounded object such as a finger. An NBS scan can be slow, however, because if it is desired to examine multiple (or all) touch pixels for the presence of a grounded touch or floating water, the touch pixels would have to be sequentially reconfigured and separately scanned to capture a self-capacitance measurement for each of the measured touch pixels.

Figure 6:
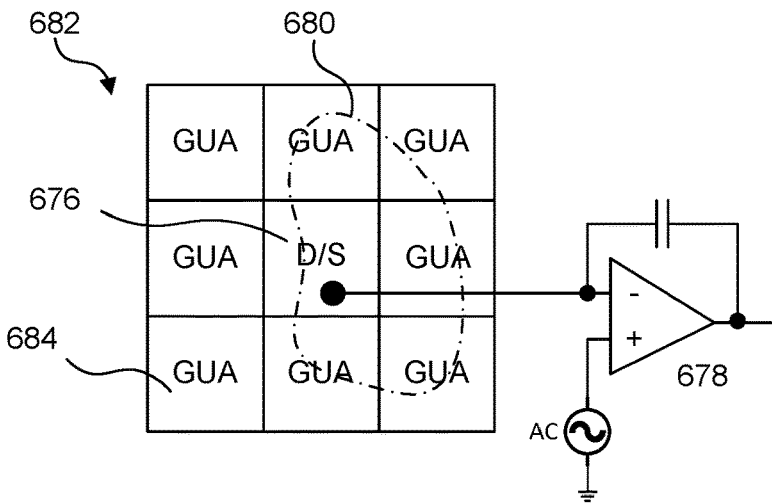
FIG. 6 illustrates a bootstrapped (BS) touch pixel configuration that can be configured for performing a BS scan according to examples of the disclosure.

FIG. 6 illustrates a bootstrapped (BS) touch pixel configuration 682 that can be configured for performing a BS scan according to examples of the disclosure. In the example of FIG. 6, eight guard touch pixels 684 (labeled "GUA") are laterally and diagonally adjacent to, and surround a self-capacitance touch pixel 676 (labeled "D/S"), although it should be understood that FIG. 6 represents only a small portion of a larger touch pixel configuration, and that other configurations of sparse self-capacitance touch pixels surrounded by stimulated touch pixels can also be employed. In some examples, each touch pixel 684 and 676 can correspond to touch pixel 456 described above with respect to FIG. 4. The touch pixels in FIG. 6 can be configured using the switching circuitry described above such that the self-capacitance touch pixel 676 is coupled to AFE 678, which is configured to receive a stimulation signal for self-capacitance sensing at its noninverting input and both drive and sense the self-capacitance touch pixel at its inverting input. In addition, the switching circuitry can be configured to drive guard touch pixels 684 with the same stimulation signal (same frequency and phase) as the stimulation signal generated by AFE 678.

When a grounded object such as a finger appears at least partially over self-capacitance touch pixel 676, a capacitive path to ground can be formed from the self-capacitance touch pixel to the ground through the grounded object. The capacitive path causes a flow of charge to ground and a resultant increase in the self-capacitance of self-capacitance touch pixel 676. This increase in self-capacitance can be detected by AFE 678, and thus the grounded object can be detected and distinguished from a no-touch condition using one or more processors described above. When floating water droplet 680 appears at least partially over self-capacitance touch pixel 676 and at least partially over any or all of guard touch pixels 684, no capacitive path to ground is provided, because all pixels are being stimulated (and not grounded). The lack of a capacitive path to ground produces no significant change in the self-capacitance of self-capacitance touch pixel 676, and thus floating water droplet 680 may not be distinguishable from a no-touch condition, though it is distinguishable from the touch of a grounded object such as a finger.

Figure 7:
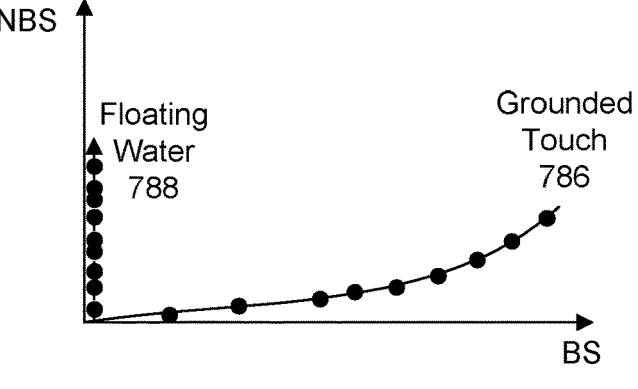
FIG. 7 is a two-dimensional graph of BS scan self-capacitance vs. NBS scan self-capacitance illustrating the detection of floating water and grounded objects according to examples of the disclosure.

FIG. 7 is a two-dimensional graph of BS scan self-capacitance vs. NBS scan self-capacitance illustrating the detection of floating water and grounded objects according to examples of the disclosure. In the example of FIG. 7, the origin represents the baseline (no-touch) self-capacitance (SC) of a touch pixel. Various points along the BS axis represent different amounts of the change in self-capacitance (relative to the baseline self-capacitance at the origin) of a touch pixel configured in a BS scan. Various points along the NBS axis represent different amounts of the change in self-capacitance (relative to the baseline self-capacitance at the origin) of a touch pixel configured in a NBS scan. Along either axis, increased changes in self-capacitance are an indication that more charge is being coupled to ground from the self-capacitance touch pixel.

Plot 786 represents, for each point along the curve, a particular touch pixel and its change in self-capacitance for both BS and NBS scans in the presence of a grounded object. Because grounded objects cause a change (increase) in self-capacitance of a touch pixel in both BS and NBS scans, each point (touch pixel) in plot 786 has a positive value along both the BS and NBS axes. Plot 788 of changes in self-capacitance for floating water indicates, for each point along the curve, a particular touch pixel and its change (if any) in self-capacitance for both BS and NBS scans in the presence of floating water. Because floating water does not cause a change in the self-capacitance of a touch pixel in a BS scan, each point (touch pixel) in plot 788 has a zero value (representing no change in self-capacitance) along the BS axis. However, because floating water causes a change (increase) in self-capacitance of a touch pixel in a NBS scan, plot 788 indicates, for each point along the curve, a particular touch pixel and its change in self-capacitance for a NBS scan in the presence of floating water. Accordingly, whenever a touch pixel experiences a change in self-capacitance only during a NBS scan, and not during a BS scan, it can be assumed that the touch pixel is in the presence of floating water, and not a grounded object. Conversely, whenever a touch pixel experiences a change in self-capacitance during both a NBS scan and a BS scan, it can be assumed that the touch pixel is in the presence of a grounded object, and not floating water. Thus, by configuring touch pixels to perform both BS and NBS scans, and comparing the two, floating water can be detected. For example, subtracting the results of a BS scan (detects grounded objects only) from the results of a NBS scan (detects both grounded objects and floating water) for each touch pixel can produce an image of floating water.

Figure 8A:
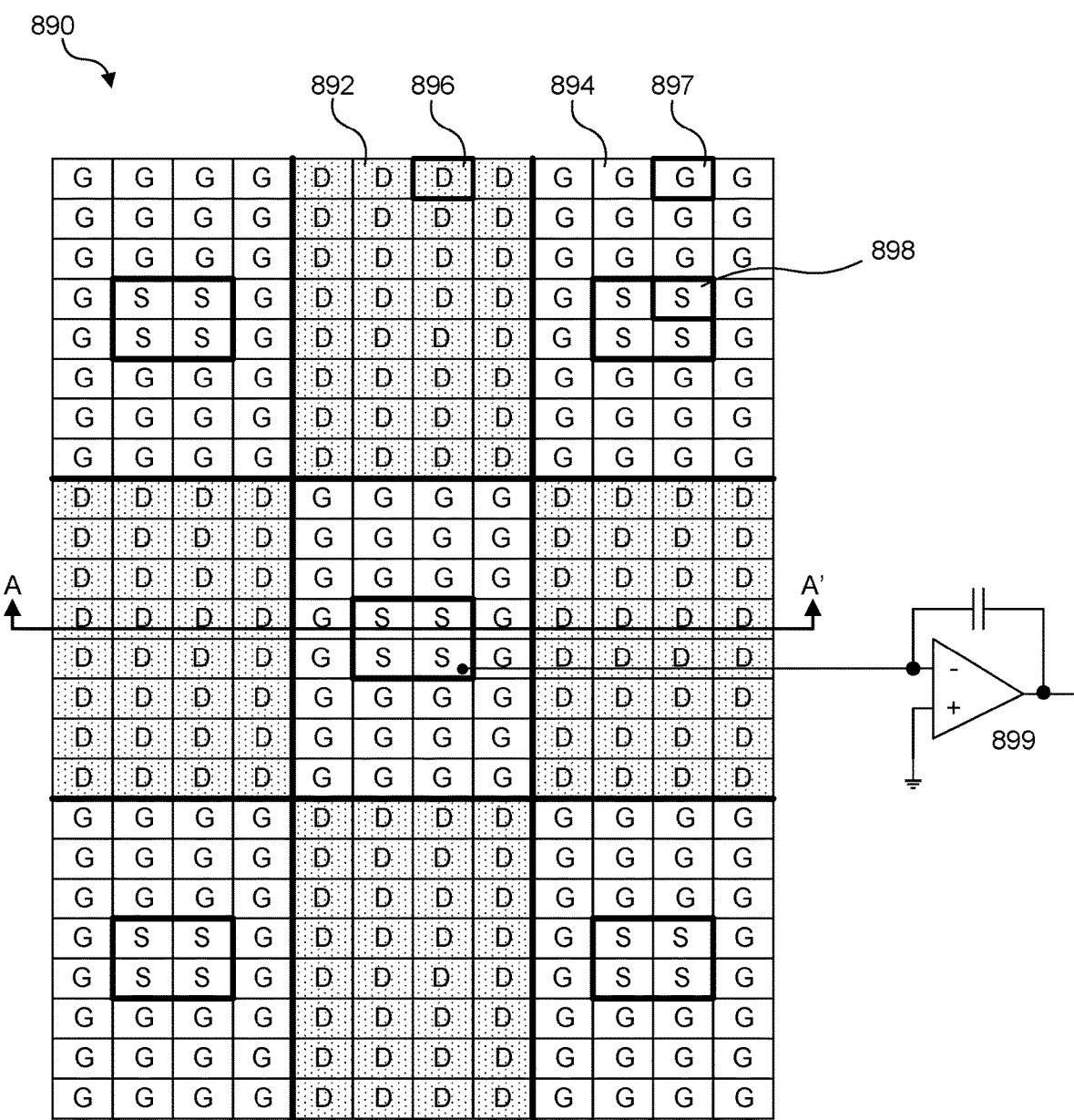
FIG. 8A illustrates a PMC touch pixel configuration that can be configured for performing a PMC scan according to examples of the disclosure.

FIG. 8A illustrates a pixelated mutual capacitance (PMC) touch pixel configuration 890 that can be configured for performing a PMC scan according to examples of the disclosure. In the example of FIG. 8A, four drive pixels 892 are arranged in a checkerboard fashion with respect to four sense pixels 894, with the drive and sense pixels forming an array of mutual capacitance sensors in an alternating checkerboard arrangement. It should be understood that FIG. 8A represents only a small portion of a larger touch pixel configuration. In other words, drive pixels 892 are diagonally adjacent to other drive pixels, and sense pixels 894 are diagonally adjacent to other sense pixels, such that the drive pixels are not laterally adjacent to each other, and the sense pixels are not laterally adjacent to each other. In some examples, each drive pixel 892 and sense pixel 894 can correspond to touch pixel 456 described above with respect to FIG. 4. In some examples, drive pixels 892 and sense pixels 894 can include a plurality of sub-pixels, which in some examples can correspond to touch node electrodes 458 in FIG. 4. However, in other embodiments, micro-LEDs and sub-pixels may not be employed, and instead other mechanisms can be utilized to create configurable drive, sense and ground regions from discrete conductive material such as ITO banks 462. Although drive pixels 892 and sense pixels 894 are shown in the example of FIG. 8A in a regular checkerboard arrangement of alternating and adjacent drive and sense pixels, in other examples other arrangements are contemplated, such as an arrangement where fewer sense pixels, in a regular or irregular pattern, are surrounded by a larger number of drive pixels.

In some examples, drive pixels 892 can include drive regions. In some examples, a drive region can be a single continuous conductive layer, and in other examples, a drive region can include a plurality of drive sub-pixels 896 (labeled "D"). Drive sub-pixels 896 can be configured using one or more of the sensing circuitry, switching circuitry, and control circuitry described above with respect to FIG. 4 to receive either the positive or negative phase of a stimulation signal for mutual capacitance sensing. In some examples, the mutual capacitance drive stimulation signal can be generated by an AFE circuit coupled to drive sub-pixels 896. In other examples, the mutual capacitance drive stimulation signal can be generated by separate scan logic. Although drive pixels 892 are illustrated in the example of FIG. 8A as including a 4×8 array of drive sub-pixels 896, other arrangements of drive sub-pixels are also contemplated.

In some examples, sense pixels 894 can include sense regions and ground regions. In some examples, a sense region can be a single continuous conductive layer, and in other examples, a sense region can include one or more sense sub-pixels 898 (labeled "S"). Although sense sub-pixels 898 are illustrated in the example of FIG. 8A as including a 2×2 array of sense sub-pixels in a sense region, other arrangements of sense sub-pixels are also contemplated. Sense sub-pixels 898 can be configured using one or more of the sensing circuitry, switching circuitry, and control circuitry described above with respect to FIG. 4 to be communicatively coupled to a sense circuit such as AFE 899 (only one is shown in FIG. 8A to simplify the figure), which can be configured to receive a sense signal from a sense sub-pixel at its inverting input, while its noninverting input is held at a reference voltage such as ground. AFE 899 can be configured to generate a signal indicative of the mutual capacitance seen at sense sub-pixel 898, and can therefore be used to detect changes in mutual capacitance at the sense sub-pixel. Note that although only one sense sub-pixel 898 in a group of adjacent sense sub-pixels is illustrated in FIG. 8A as being communicatively coupled to AFE 899, in some examples the sense sub-pixels can be electrically coupled together (not shown), or in other examples each sense sub-pixel can be coupled to a separate AFE.

In some examples, a ground region can be a single continuous conductive layer that surrounds the sense region, and in other examples, a ground region can include a plurality of ground sub-pixels 897. One or more of the sensing circuitry, switching circuitry, and control circuitry described above can configure ground sub-pixels 897 (labeled "G") to be held at the reference voltage such as ground. Ground sub-pixels 897 can be arranged into a ground region around sense sub-pixels 898 and configured to separate drive pixels 892 from the sense sub-pixels by at least one ground sub-pixel. Although sense pixels 894 are illustrated in the example of FIG. 8A as including a 2×2 array of sense sub-pixels 898 surrounded by 28 ground sub-pixels 897, other arrangements are also contemplated.

Figure 8B:
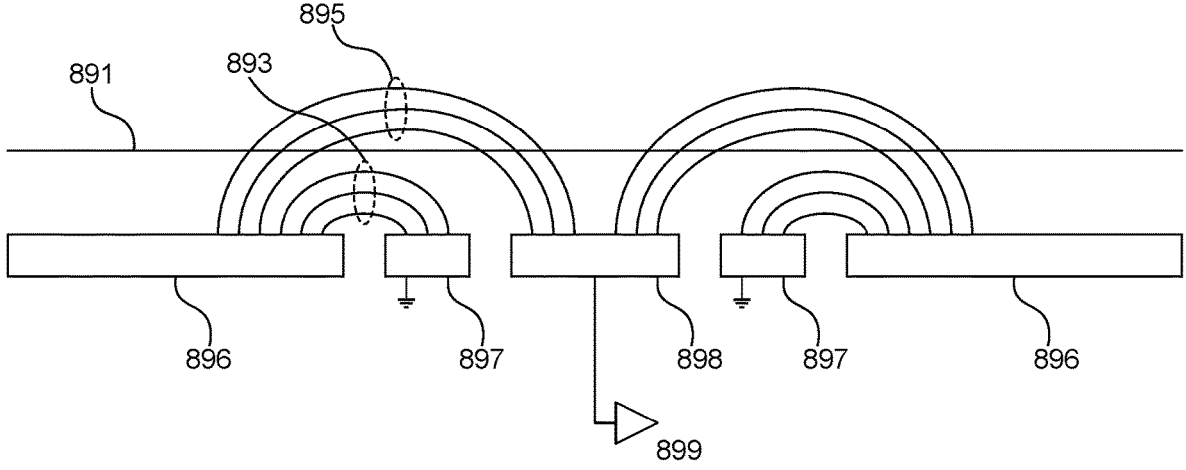
FIG. 8B illustrates a cross-sectional view of the PMC touch pixel configuration of FIG. 8A, from the perspective of lines A-A' in FIG. 8A according to examples of the disclosure.

FIG. 8B illustrates a cross-sectional view of the PMC touch pixel configuration of FIG. 8A, from the perspective of lines A-A' in FIG. 8A according to examples of the disclosure. In the example of FIG. 8B, drive sub-pixels 896 are being stimulated with a stimulation signal, and electric field lines 895 are formed between the drive sub-pixels and sense sub-pixels 898. However, some electric field lines 893 capacitively couple to ground sub-pixels 897, effectively shunting some charge to ground and reducing the mutual capacitance between drive sub-pixels 896 and sense sub-pixels 898. Because electric field lines 893 are formed below touch surface 891 and cannot capacitively couple to an object in proximity to the touch surface, shunting those electric field lines to ground reduces the baseline (no-touch) mutual capacitance between the drive and sense sub-pixels. In other words, the offset mutual capacitance (the static portion of the mutual capacitance that is present regardless of whether a grounded object is in proximity to the touch surface) is reduced. This, in turn, increases the percentage change in mutual capacitance that occurs when a grounded object intercepts electric field lines 895 (e.g., increases the signal to baseline ratio), making touch detection easier. In addition, the reduced baseline or offset mutual capacitance makes the detection of relatively small changes in mutual capacitance (e.g., relatively small increases in mutual capacitance due to the presence of floating water) easier to detect. The reduced offset or baseline mutual capacitance can also advantageously make tuning of AFE 899 easier because of its reduced range of operation.

Figure 8C:
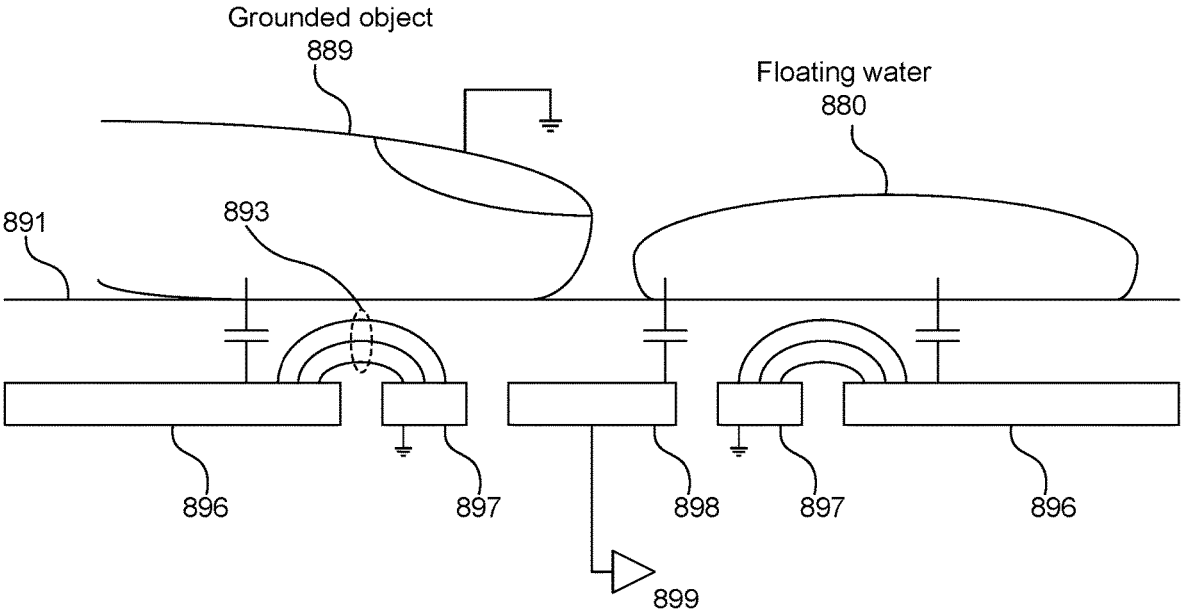
FIG. 8C illustrates a cross-sectional view of the PMC touch pixel configuration of FIG. 8A, from the perspective of lines A-A' in FIG. 8A according to examples of the disclosure.

FIG. 8C illustrates a cross-sectional view of the PMC touch pixel configuration of FIG. 8A, from the perspective of lines A-A' in FIG. 8A according to examples of the disclosure. The example of FIG. 8C is similar to that of FIG. 8B, except that grounded object 889 (e.g., a finger) is present at the left of FIG. 8C, and floating water droplet 880 is present at the right of FIG. 8C. As shown in FIG. 8C, grounded object 889 capacitively couples to drive sub-pixel 896, which shunts charge to ground. As a result, fewer electric field lines are formed between drive sub-pixel 896 and sense sub-pixel 898, and the mutual capacitance between the two is reduced. In addition, floating water droplet 880 capacitively couples to drive sub-pixel 896, and also capacitively couples to sense sub-pixel 898. Because floating water droplet 880 is a good conductor of electricity, the capacitive coupling between drive sub-pixel 896 and sense sub-pixel 898 increases, and the mutual capacitance between the two is increased.

Figure 9:
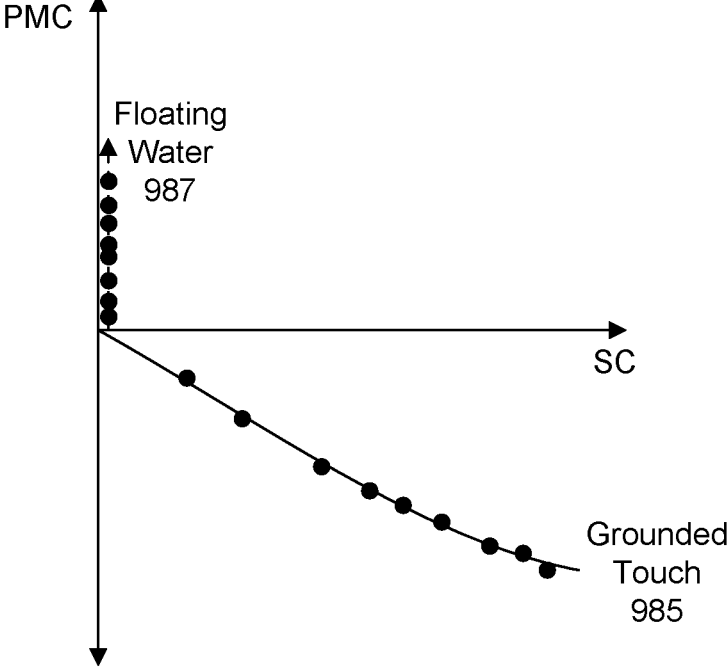
FIG. 9 is a two-dimensional graph of SC scan self-capacitance vs. PMC scan mutual-capacitance illustrating the detection of floating water and grounded objects according to examples of the disclosure.

FIG. 9 is a two-dimensional graph of SC scan self-capacitance vs. PMC scan mutual-capacitance illustrating the detection of floating water and grounded objects according to examples of the disclosure. In the example of FIG. 9, with respect to the PMC axis, the origin represents the baseline (no-touch) mutual-capacitance of a touch pixel, and various points along the PMC axis represent different amounts of the change in mutual-capacitance (relative to the baseline mutual-capacitance at the origin) of a touch pixel configured in a PMC scan. With respect to the SC axis, the origin represents the baseline (no-touch) self-capacitance of a touch pixel, and various points along the SC axis represent different amounts of the change in self-capacitance (relative to the baseline self-capacitance at the origin) of a touch pixel configured in a SC scan.

Because floating water increases the mutual-capacitance of a touch pixel in a PMC scan, plot 987 represents, for each point along the curve, a particular touch pixel and its (positive) change in mutual capacitance in the presence of floating water when configured for a PMC scan according to examples of the disclosure. Because a grounded object decreases the mutual capacitance of a touch pixel in a PMC scan, but increases the self-capacitance of a touch pixel in a SC scan (either a BS or NB S scan), plot 985 represents, for each point along the curve, a particular touch pixel and its (negative) change in mutual capacitance in the presence of a grounded object when configured for a PMC scan, and its (positive) change in mutual capacitance in the presence of a grounded object when configured for a SC scan. With the direction, sign or polarity of the change in mutual capacitance in a PMC scan being opposite for floating water and a grounded object, the PMC scan provides an easily distinguishable "signature" with good separation for floating water and grounded objects.

Accordingly, whenever a touch pixel detects an increase in mutual-capacitance during a PMC scan, it can be assumed that the touch pixel is in the presence of floating water, and not a grounded object. Conversely, whenever a touch pixel experiences a decrease in mutual-capacitance during a PMC scan, it can be assumed that the touch pixel is in the presence of a grounded object, and not floating water. Thus, in some examples, after performing a scan of the touch sensor panel or integrated touch screen, the one or more processors described above can process the touch data, and the touch pixels with increased mutual capacitance values can be attributed to floating water (subject to optional filtering) without needing to perform additional scans, and the touch pixels with decreased mutual capacitance can be attributed to grounded objects (subject to optional filtering) without needing to perform and compare additional scans to detect and remove the effects of floating water. An image of the floating liquid can be captured, and an image of grounded objects can also be captured.

In some examples, to produce more reliable and accurate results, the checkboard pattern of the PMC scan can be reversed (e.g., drive pixels become sense pixels, and vice versa), another scan of the integrated touch screen can be performed as described above, and the two scans can be combined and processed by the one or more processors to produce a more reliable image of floating water and grounded touches. In some examples, the data from both scans can be combined because the data from each scan is captured from different sets of sense pixels, and is not redundant. In other examples, image boundary data (e.g., the borders of the captured images of touch) of each scan can be averaged to compute a composite boundary. In other examples, parameters such as average pixel intensity, centroids, or major and minor axes for the captured images in each scan can be averaged.

In some examples of the disclosure, rather than utilizing one or more PMC scans to detect both floating water and grounded touches, the integrated touch screen can be configured to perform PMC scans to detect floating water, and configured to perform self-capacitance scans (e.g., a BS scan) to detect grounded objects. In some examples, in one scan the touch pixels of FIG. 8A can be configured for a PMC scan, and in another scan the same touch pixels can be reconfigured for a BS scan as shown in FIG. 6. In some examples, a methodology of utilizing BS scans for grounded object detection and utilizing PMC scans for floating water detection can advantageously detect grounded objects using BS scans while avoiding the slowness of NBS scans, and also detect and distinguish floating water from a zero signal (no touch) condition. By developing an image of floating water across the panel, that water can advantageously be removed from captured touch images to increase the accuracy of the touch images. In addition, the image of floating water can advantageously used as inputs to perform other features, such as those based on the detection of wet environments (e.g., activation of a water lock feature, or device water ejection).

Figure 10:
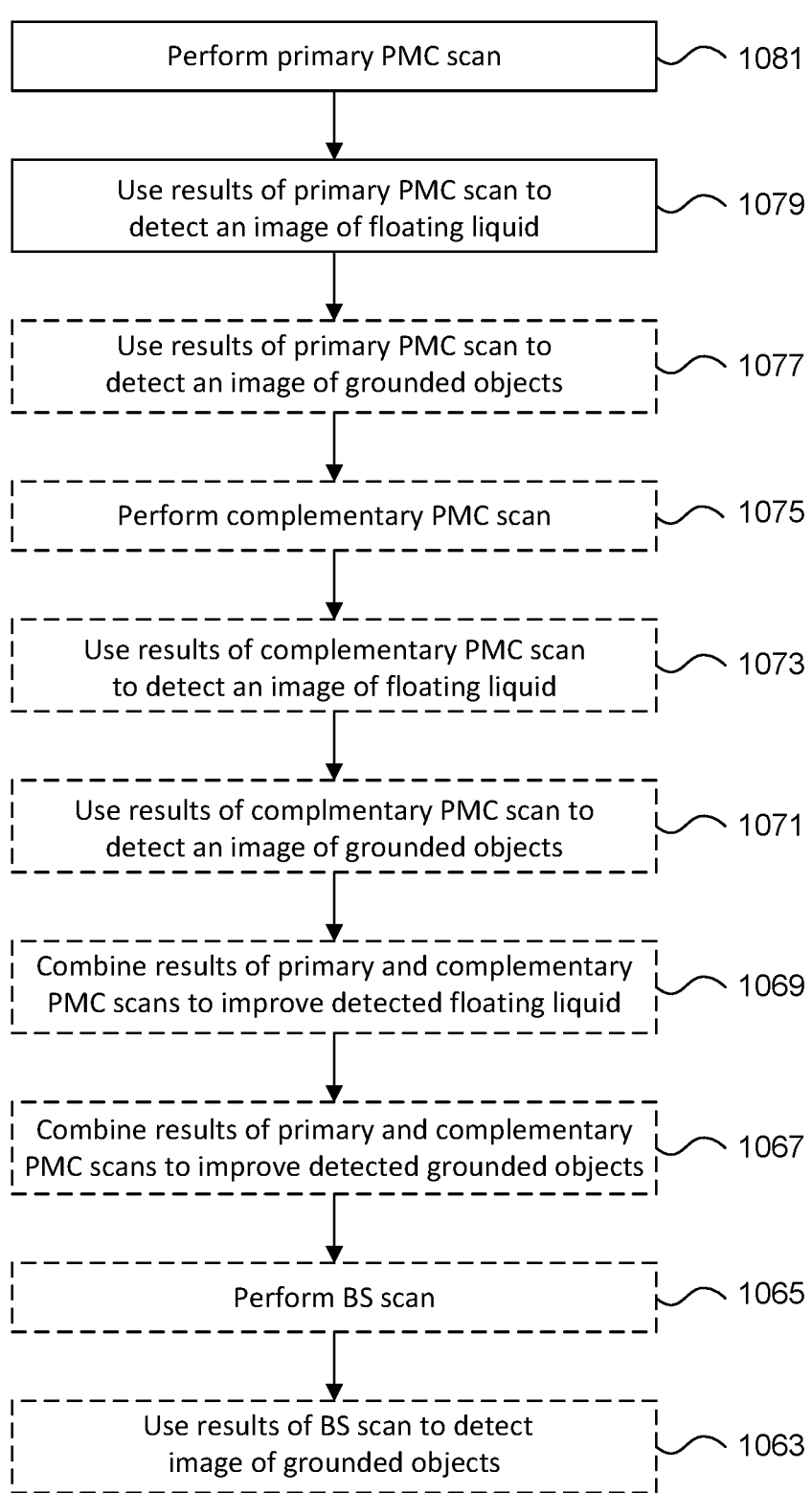
FIG. 10 illustrates a flow diagram for a method of performing a PMC scan and optionally a BS scan to detect floating water and optionally a grounded object according to examples of the disclosure.

FIG. 10 illustrates a flow diagram for a method of performing a PMC scan and optionally a BS scan to detect floating liquid and optionally a grounded object according to examples of the disclosure. In the example of FIG. 10, a primary PMC scan can be performed at 1081 to detect floating liquid at 1079, and optionally a grounded object at 1077. A complementary PMC scan can optionally be performed at 1075 to detect the floating liquid at 1073, and optionally the grounded object at 1071. The complementary PMC scan can be used together with the primary PMC scan to improve the accuracy of the floating liquid detection at 1069, and optionally the grounded object at 1067. A BC scan can optionally be performed at 1065 to detect a grounded object at 1063.

Therefore, according to the above, some examples of the disclosure are directed to a touch sensor panel comprising an array of configurable first pixels and second pixels in an alternating checkerboard arrangement, and at least one sense circuit communicatively couplable to one or more of the first pixels and second pixels, wherein in accordance with a first pixelated mutual capacitance configuration, the first pixels are first drive pixels that receive a stimulation signal for mutual capacitance sensing, the second pixels are first sense pixels, each first sense pixel including a first sense region and a first ground region, the first ground region of each first sense pixel is positioned between the first sense region of the first sense pixel and a plurality of first drive pixels to capacitively couple with the plurality of first drive pixels, and the at least one sense circuit is communicatively coupled to one of the first sense regions for detecting changes in mutual capacitance between one or more of the first drive pixels and the first sense region. Additionally or alternatively to one of more of the examples disclosed above, in some examples in the alternating checkerboard arrangement, each first pixel is diagonally adjacent to one or more of the first pixels, and each second pixel is diagonally adjacent to one or more of the second pixels. Additionally or alternatively to one of more of the examples disclosed above, in some examples, in accordance with the first pixelated mutual capacitance configuration, the first drive pixels include a plurality of first drive sub-pixels, each first drive sub-pixel coupled to the at least one sense circuit for receiving the stimulation signal, the first sense regions of the plurality of first sense pixels include one or more first sense sub-pixels, each first sense sub-pixel positioned with respect to one or more of the first drive pixels for capacitively coupling with the one or more first drive pixels, and the first ground regions of the plurality of first sense pixels include a plurality of first ground sub-pixels. Additionally or alternatively to one of more of the examples disclosed above, in some examples, in accordance with the first pixelated mutual capacitance configuration, the first sense regions of the plurality of first sense pixels are separated from the plurality of first drive pixels by at least one first ground sub-pixel. Additionally or alternatively to one of more of the examples disclosed above, in some examples the touch sensor panel further comprises one or more processors communicatively coupled to the at least one sense circuit, wherein in accordance with the first pixelated mutual capacitance configuration, the one or more processors are configured to identify one or more of the first sense regions having increased mutual capacitance as compared to a baseline mutual capacitance as being in proximity to floating liquid, and capture a first image of floating liquid from the identified first sense regions. Additionally or alternatively to one of more of the examples disclosed above, in some examples, in accordance with the first pixelated mutual capacitance configuration, the one or more processors are further configured to identify one or more of the first sense regions with decreased mutual capacitance as compared to the baseline mutual capacitance as being in proximity to a grounded object, and capture a first image of grounded objects from the identified first sense regions. Additionally or alternatively to one of more of the examples disclosed above, in some examples, in accordance with a second pixelated mutual capacitance configuration, the second pixels are second drive pixels to receive the stimulation signal, the first pixels are second sense pixels, each second sense pixel including a second sense region and a second ground region, the second ground region of each second sense pixel is positioned between the second sense region of the second sense pixel and a plurality of second drive pixels to capacitively couple with the plurality of second drive pixels, and the at least one sense circuit is communicatively coupled to one of the second sense regions for detecting changes in mutual capacitance between one or more of the second drive pixels and the second sense region. Additionally or alternatively to one of more of the examples disclosed above, in some examples, in accordance with the second pixelated mutual capacitance configuration, the second drive pixels include a plurality of second drive sub-pixels, each second drive sub-pixel coupled to the at least one sense circuit for receiving the stimulation signal, the second sense regions of the plurality of second sense pixels include one or more second sense sub-pixels, each second sense sub-pixel positioned with respect to one or more of the second drive pixels for capacitively coupling with the one or more second drive pixels, and the second ground regions of the plurality of second sense pixels include a plurality of second ground sub-pixels. Additionally or alternatively to one of more of the examples disclosed above, in some examples, in accordance with the second pixelated mutual capacitance configuration, the second sense regions of the plurality of second sense pixels are separated from the plurality of second drive pixels by at least one second ground sub-pixel. Additionally or alternatively to one of more of the examples disclosed above, in some examples the touch sensor panel further comprises one or more processors communicatively coupled to the at least one sense circuit, wherein in accordance with the second pixelated mutual capacitance configuration, the one or more processors are configured to identify one or more of the second sense regions having increased mutual capacitance as compared to a baseline mutual capacitance as being in proximity to floating liquid, and capture a second image of floating liquid from the identified second sense regions. Additionally or alternatively to one of more of the examples disclosed above, in some examples, in accordance with the second pixelated mutual capacitance configuration, the one or more processors are further configured to identify one or more of the second sense regions with decreased mutual capacitance as compared to the baseline mutual capacitance as being in proximity to a grounded object, and capture a second image of grounded objects from the identified second sense regions. Additionally or alternatively to one of more of the examples disclosed above, in some examples the one or more processors are further configured to determine an image of floating liquid from the detected changes in mutual capacitance between the one or more first drive pixels and the first sense region, and from the detected changes in mutual capacitance between the one or more second drive pixels and the second sense region. Additionally or alternatively to one of more of the examples disclosed above, in some examples, in accordance with a bootstrapped self-capacitance configuration, at least one of the first pixels or at least one of the second pixels is a self-capacitance sense pixel coupled to the at least one sense circuit to receive a stimulation signal for self-capacitance sensing and generate a self-capacitance sense signal, a plurality of the first pixels laterally adjacent to the at least one self-capacitance sense pixel are guard pixels to receive a guard stimulation signal, a plurality of the second pixels diagonally adjacent to the at least one self-capacitance sense pixel are additional guard pixels to receive the guard stimulation signal, and the at least one sense circuit is communicatively coupled to the self-capacitance sense pixel to generate the stimulation signal for self-capacitance sensing and receive the self-capacitance sense signal for detecting changes in self-capacitance on the self-capacitance sense pixel. Additionally or alternatively to one of more of the examples disclosed above, in some examples, in accordance with the bootstrapped self-capacitance configuration, the self-capacitance sense pixel is formed from a plurality of self-capacitance sense sub-pixels, each self-capacitance sense sub-pixel coupled to the at least one sense circuit for receiving the stimulation signal for self-capacitance sensing, and the guard pixels are formed from a plurality of guard sub-pixels, each guard sub-pixel configured for receiving the guard stimulation signal. Additionally or alternatively to one of more of the examples disclosed above, in some examples the touch sensor panel further comprises one or more processors communicatively coupled to the at least one sense circuit, wherein in accordance with the bootstrapped self-capacitance configuration, the one or more processors are configured to identify the self-capacitance sense pixels with increased self-capacitance as compared to a baseline self-capacitance as being in proximity to a grounded object, and capture a third image of grounded objects from those self-capacitance sense pixels.

Some embodiments of the disclosure are directed to a method for detecting an object, comprising, at a touch sensing device including a touch sensor panel and one or more processors, arranging an array of configurable first pixels and second pixels in the touch sensor panel in an alternating checkerboard arrangement, and in accordance with a first pixelated mutual capacitance configuration, receiving a stimulation signal for mutual capacitance sensing at a plurality of first drive pixels that comprise the first pixels, configuring the second pixels as a plurality of first sense pixels, each first sense pixel including a first sense region and a first ground region, separating the plurality of first drive pixels from the first sense region of each first sense pixel using the first ground region of each first sense pixel, and capacitively coupling the first sense region with one or more of the first drive pixels, and detecting changes in mutual capacitance between one or more of the first drive pixels and the first sense region of each first sense pixel using at least one sense circuit communicatively coupled to the first sense regions. Additionally or alternatively to one of more of the examples disclosed above, in some examples the method further comprises arranging each first pixel diagonally adjacent to one or more of the first pixels, and arranging each second pixel diagonally adjacent to one or more of the second pixels. Additionally or alternatively to one of more of the examples disclosed above, in some examples, in accordance with the first pixelated mutual capacitance configuration, the method further comprises receiving the stimulation signal at a plurality of first drive sub-pixels that form the first drive pixels, capacitively coupling each first sense sub-pixel that forms the first sense regions of the plurality of first sense pixels with one or more of the first drive pixels, and forming the first ground regions of the plurality of first sense pixels with a plurality of first ground sub-pixels. Additionally or alternatively to one of more of the examples disclosed above, in some examples, in accordance with the first pixelated mutual capacitance configuration, the method further comprises separating the first sense regions of the plurality of first sense pixels from the plurality of first drive pixels by at least one first ground sub-pixel. Additionally or alternatively to one of more of the examples disclosed above, in some examples, in accordance with the first pixelated mutual capacitance configuration, the method further comprises identifying one or more of the first sense regions having increased mutual capacitance as compared to a baseline mutual capacitance as being in proximity to floating liquid, and capturing a first image of floating liquid from the identified first sense regions. Additionally or alternatively to one of more of the examples disclosed above, in some examples, in accordance with the first pixelated mutual capacitance configuration, the method further comprises identifying one or more of the first sense regions with decreased mutual capacitance as compared to the baseline mutual capacitance as being in proximity to a grounded object, and capturing a first image of grounded objects from the identified first sense regions. Additionally or alternatively to one of more of the examples disclosed above, in some examples, in accordance with a second pixelated mutual capacitance configuration, the method further comprises receiving the stimulation signal at a plurality of second drive pixels that comprise the second pixels, configuring the first pixels as a plurality of second sense pixels, each second sense pixel including a second sense region and a second ground region, separating the plurality of second drive pixels from the second sense region of each second sense pixel using the second ground region of each second sense pixel, and capacitively coupling the second sense region with one or more of the second drive pixels, and detecting changes in mutual capacitance between one or more of the second drive pixels and the second sense region using at least one sense circuit communicatively coupled to one of the second regions. Additionally or alternatively to one of more of the examples disclosed above, in some examples, in accordance with the second pixelated mutual capacitance configuration, the method further comprises receiving the stimulation signal at a plurality of second drive sub-pixels that form the second drive pixels, capacitively coupling each second sense sub-pixel that forms the second sense regions of the plurality of second sense with one or more of the second drive pixels, and forming the second ground regions of the plurality of second sense pixels with a plurality of second ground sub-pixels. Additionally or alternatively to one of more of the examples disclosed above, in some examples, in accordance with the second pixelated mutual capacitance configuration, the method further comprises separating the second sense regions of the plurality of second sense pixels from the plurality of second drive pixels by at least one second ground sub-pixel. Additionally or alternatively to one of more of the examples disclosed above, in some examples, in accordance with the second pixelated mutual capacitance configuration, the method further comprises identifying one or more of the second sense regions having increased mutual capacitance as compared to a baseline mutual capacitance as being in proximity to floating liquid, and capturing a second image of floating liquid from the identified second sense regions. Additionally or alternatively to one of more of the examples disclosed above, in some examples, in accordance with the second pixelated mutual capacitance configuration, the method further comprises identifying one or more of the second sense regions with decreased mutual capacitance as compared to the baseline mutual capacitance as being in proximity to a grounded object, and capturing a second image of grounded objects from the identified second sense regions. Additionally or alternatively to one of more of the examples disclosed above, in some examples the method further comprises determining an image of floating liquid from the detected changes in mutual capacitance between the one or more first drive pixels and the first sense region, and from the detected changes in mutual capacitance between the one or more second drive pixels and the second sense region. Additionally or alternatively to one of more of the examples disclosed above, in some examples, in accordance with a bootstrapped self-capacitance configuration, the method further comprises receiving stimulation signal for self-capacitance sensing and generating a self-capacitance sense signal at one or more of the first pixels or at one or more of the second pixels configured as a self-capacitance sensing pixel, receiving a guard stimulation signal at a plurality of the first pixels laterally adjacent to the at least one self-capacitance sense pixel configured as guard pixels, receiving the guard stimulation signal at a plurality of the second pixels diagonally adjacent to the at least one self-capacitance sense pixel configured as additional guard pixels, and generating the stimulation signal for self-capacitance sensing and receiving the self-capacitance sense signal at the at least one sense circuit communicatively coupled to the self-capacitance sense pixel for detecting changes in self-capacitance on the self-capacitance sense pixel. Additionally or alternatively to one of more of the examples disclosed above, in some examples, in accordance with the bootstrapped self-capacitance configuration, the method further comprises forming the self-capacitance sense pixel from a plurality of self-capacitance sense sub-pixels, and receiving the stimulation signal for self-capacitance sensing at each self-capacitance sense sub-pixel, and receiving the guard stimulation signal at each guard sub-pixel that forms the guard pixels. Additionally or alternatively to one of more of the examples disclosed above, in some examples, in accordance with the bootstrapped self-capacitance configuration, the method further comprises identifying the self-capacitance sense pixels with increased self-capacitance as compared to a baseline self-capacitance as being in proximity to a grounded object, and capturing a third image of grounded objects from those self-capacitance sense pixels. Some examples of the disclosure are directed to a computing device configured for performing one or more of the methods described above. Additionally or alternatively to one of more of the examples disclosed above, in some examples a non-transitory computer-readable storage medium stores instructions that, when executed by the one or more processors at the touch sensing device, causes the one or more processors to perform one more of the example methods disclosed above.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel, comprising:
an array of configurable first pixels and second pixels in an alternating checkerboard arrangement, wherein the first pixels include a first plurality of sub-pixels, the second pixels include a second plurality of sub-pixels, and the first plurality of sub-pixels and the second plurality of sub-pixels are configurable into a first pixelated mutual capacitance configuration and into a second pixelated mutual capacitance configuration; and
at least one sense circuit communicatively couplable to one or more of the first pixels and second pixels;
wherein in accordance with the first pixelated mutual capacitance configuration,
the first pixels are comprise a plurality of first drive pixels, wherein the first plurality of sub-pixels are configured as a plurality of first drive sub-pixels to receive a stimulation signal for mutual capacitance sensing,
the second pixels are comprise a plurality of first sense pixels, each first sense pixel including a first sense region and a first ground region,
each first sense region of the plurality of first sense pixels includes a first portion of the second plurality of sub-pixels configured as one or more first sense sub-pixels, each first sense sub-pixel of the one or more first sense sub-pixels positioned with respect to one or more of the first drive pixels for capacitively coupling with the one or more first drive pixels,
each first ground region of the plurality of first sense pixels includes a second portion of the second plurality of sub-pixels configured as a plurality of first ground sub-pixels,
the first ground region of each first sense pixel is positioned between the first sense region of the first sense pixel and a plurality of first drive pixels to capacitively couple with the plurality of first drive pixels, and
the at least one sense circuit is communicatively coupled to one of the first sense regions for detecting changes in mutual capacitance between one or more of the first drive pixels and the first sense region;
wherein in accordance with the second pixelated mutual capacitance configuration:
the second pixels comprise a plurality of second drive pixels, wherein the second plurality of sub-pixels are configured as a plurality of second drive sub-pixels to receive the stimulation signal,
the first pixels comprise a plurality of second sense pixels, each second sense pixel including a second sense region and a second ground region,
the second ground region of each second sense pixel includes a first portion of the first plurality of sub-pixels configured as one or more second sense sub-pixels, each second sense sub-pixels of the one or more second sense sub-pixels positioned with respect to one or more of the second drive pixels for capacitively coupling with the one or more second drive pixels, each second ground region of the plurality of second sense pixels includes a second portion of the first plurality of sub-pixels configured as a plurality of second ground sub-pixels, the second ground region of each second sense pixel is positioned between the second sense region of the second sense pixel and a plurality of second drive pixels to capacitively couple with the plurality of second drive pixels, and the at least one sense circuit is communicatively coupled to one of the second sense regions for detecting changes in mutual capacitance between one or more of the second drive pixels and the second sense region; and wherein a position of ground sub-pixels is different between the first pixelated mutual capacitance configuration and the second pixelated mutual capacitance configuration.

2. The touch sensor panel of claim 1, wherein in the alternating checkerboard arrangement:

each first pixel is diagonally adjacent to one or more of the first pixels; and each second pixel is diagonally adjacent to one or more of the second pixels.

3. The touch sensor panel of claim 1, wherein in accordance with the first pixelated mutual capacitance configuration:

the first sense regions of the plurality of first sense pixels are separated from the plurality of first drive pixels by at least one first ground sub-pixel.

4. The touch sensor panel of claim 1, further comprising one or more processors communicatively coupled to the at least one sense circuit, wherein in accordance with the first pixelated mutual capacitance configuration, the one or more processors are configured to:

identify one or more of the first sense regions having increased mutual capacitance as compared to a baseline mutual capacitance as being in proximity to floating liquid, and capture a first image of floating liquid from the identified first sense regions.

5. The touch sensor panel of claim 4, wherein in accordance with the first pixelated mutual capacitance configuration, the one or more processors are further configured to:

identify one or more of the first sense regions with decreased mutual capacitance as compared to the baseline mutual capacitance as being in proximity to a grounded object, and capture a first image of grounded objects from the identified first sense regions.

6. The touch sensor panel of claim 1, wherein in accordance with the second pixelated mutual capacitance configuration:

the second sense regions of the plurality of second sense pixels are separated from the plurality of second drive pixels by at least one second ground sub-pixel.

7. The touch sensor panel of claim 1, further comprising one or more processors communicatively coupled to the at least one sense circuit, wherein in accordance with the second pixelated mutual capacitance configuration, the one or more processors are configured to:

identify one or more of the second sense regions having increased mutual capacitance as compared to a baseline mutual capacitance as being in proximity to floating liquid, and capture a second image of floating liquid from the identified second sense regions.

8. The touch sensor panel of claim 7, wherein in accordance with the second pixelated mutual capacitance configuration, the one or more processors are further configured to:

identify one or more of the second sense regions with decreased mutual capacitance as compared to the baseline mutual capacitance as being in proximity to a grounded object, and capture a second image of grounded objects from the identified second sense regions.

9. The touch sensor panel of claim 7, the one or more processors further configured to:

determine an image of floating liquid from the detected changes in mutual capacitance between the one or more first drive pixels and the first sense region, and from the detected changes in mutual capacitance between the one or more second drive pixels and the second sense region.

10. The touch sensor panel of claim 1, wherein in accordance with a bootstrapped self-capacitance configuration:

at least one of the first pixels or at least one of the second pixels is a self-capacitance sense pixel coupled to the at least one sense circuit to receive a stimulation signal for self-capacitance sensing and generate a self-capacitance sense signal;

a plurality of the first pixels laterally adjacent to the at least one self-capacitance sense pixel are guard pixels to receive a guard stimulation signal;

a plurality of the second pixels diagonally adjacent to the at least one self-capacitance sense pixel are additional guard pixels to receive the guard stimulation signal; and the at least one sense circuit is communicatively coupled to the self-capacitance sense pixel to generate the stimulation signal for self-capacitance sensing and receive the self-capacitance sense signal for detecting changes in self-capacitance on the self-capacitance sense pixel.

11. The touch sensor panel of claim 10, wherein in accordance with the bootstrapped self-capacitance configuration:

the self-capacitance sense pixel is formed from a plurality of self-capacitance sense sub-pixels, each self-capacitance sense sub-pixel coupled to the at least one sense circuit for receiving the stimulation signal for self-capacitance sensing; and the guard pixels are formed from a plurality of guard sub-pixels, each guard sub-pixel configured for receiving the guard stimulation signal.

12. The touch sensor panel of claim 10, further comprising one or more processors communicatively coupled to the at least one sense circuit, wherein in accordance with the bootstrapped self-capacitance configuration, the one or more processors are configured to:

identify the self-capacitance sense pixels with increased self-capacitance as compared to a baseline self-capacitance as being in proximity to a grounded object, and capture a third image of grounded objects from those self-capacitance sense pixels.

13. The touch sensor panel of claim 1, wherein the plurality of first ground sub-pixels surrounds the first sense sub-pixels.

14. The touch sensor panel of claim 1, wherein each of the first plurality of sub-pixels and each of the second plurality of sub-pixels are individually configurable.

15. A method for detecting an object, comprising:

at a touch sensing device including a touch sensor panel and one or more processors:

arranging an array of configurable first pixels and second pixels in the touch sensor panel in an alternating checkerboard arrangement, wherein the first pixels include a first plurality of sub-pixels, the second pixels include a second plurality of sub-pixels, and the first plurality of sub-pixels and the second plurality of sub-pixels are configurable into a first pixelated mutual capacitance configuration and into a second pixelated mutual capacitance configuration;

in accordance with the first pixelated mutual capacitance configuration, receiving a stimulation signal for mutual capacitance sensing at a plurality of first drive pixels that comprise the first pixels, configuring the second pixels as a plurality of first sense pixels, each first sense pixel including a first sense region and a first ground region, separating the plurality of first drive pixels from the first sense region of each first sense pixel using the first ground region of each first sense pixel, and capacitively coupling the first sense region with one or more of the first drive pixels, and detecting changes in mutual capacitance between one or more of the first drive pixels and the first sense region of each first sense pixel using at least one sense circuit communicatively coupled to the first sense regions, wherein the first plurality of sub-pixels are configured as a plurality of first drive sub-pixels to receive the stimulation signal, wherein each first sense region of the plurality of first sense pixels includes a first portion of the second plurality of sub-pixels configured as one or more first sense sub-pixels, wherein each first ground region of the plurality of first sense pixels includes a second portion of the second plurality of sub-pixels configured as a plurality of first ground sub-pixels, and wherein the method further comprises:

receiving the stimulation signal at the plurality of first drive sub-pixels, capacitively coupling each first sense sub-pixel with one or more of the first drive pixels; and forming each first ground region of the plurality of first sense pixels with a plurality of first ground sub-pixels; and in accordance with the second pixelated mutual capacitance configuration, receiving a stimulation signal for mutual capacitance sensing at a plurality of second drive pixels that comprise the second pixels, configuring the first pixels as a plurality of second sense pixels, each second sense pixel including a second sense region and a second ground region, separating the plurality of second drive pixels from the second sense region of each second sense pixel using the second ground region of each second sense pixel, and capacitively coupling the second sense region with one or more of the second drive pixels, and detecting changes in mutual capacitance between one or more of the second drive pixels and the second sense region of each second sense pixel using at least one sense circuit communicatively coupled to the second sense regions, wherein the second plurality of sub-pixels are configured as a plurality of second drive sub-pixels to receive the stimulation signal, wherein each second sense region of the plurality of second sense pixels includes a first portion of the first plurality of sub-pixels configured as one or more second sense sub-pixels, wherein each second ground region of the plurality of second sense pixels includes a second portion of the first plurality of sub-pixels configured as a plurality of second ground sub-pixels, and wherein the method further comprises:

receiving the stimulation signal at the plurality of second drive sub-pixels, capacitively coupling each second sense sub-pixel with one or more of the second drive pixels; and forming each second ground region of the plurality of second sense pixels with a plurality of second ground sub-pixels;

wherein a position of ground sub-pixels is different between the first pixelated mutual capacitance configuration and the second pixelated mutual capacitance configuration.

16. The method of claim 15, wherein in accordance with the first pixelated mutual capacitance configuration, the method further comprises:

separating the first sense regions of the plurality of first sense pixels from the plurality of first drive pixels by at least one first ground sub-pixel.

17. The method of claim 15, wherein in accordance with the first pixelated mutual capacitance configuration, the method further comprises:

identifying one or more of the first sense regions having increased mutual capacitance as compared to a baseline mutual capacitance as being in proximity to floating liquid, and capturing a first image of floating liquid from the identified first sense regions.

18. The method of claim 15, wherein in accordance with the first pixelated mutual capacitance configuration, the method further comprises:

identifying one or more of the first sense regions with decreased mutual capacitance as compared to the baseline mutual capacitance as being in proximity to a grounded object, and capturing a first image of grounded objects from the identified first sense regions.

* * * * *